United States Patent
Amos, III

(10) Patent No.: US 10,357,687 B1
(45) Date of Patent: Jul. 23, 2019

(54) LEAN 7 FITNESS

(71) Applicant: Charlie Lee Amos, III, Desoto, TX (US)

(72) Inventor: Charlie Lee Amos, III, Desoto, TX (US)

( * ) Notice: Subject to any disclaimer, the term of this patent is extended or adjusted under 35 U.S.C. 154(b) by 535 days.

(21) Appl. No.: 15/089,117

(22) Filed: Apr. 1, 2016

Related U.S. Application Data

(60) Provisional application No. 62/245,237, filed on Oct. 22, 2015.

(51) Int. Cl.
| | |
|---|---|
| *A63B 24/00* | (2006.01) |
| *A63B 21/08* | (2006.01) |
| *A63B 69/00* | (2006.01) |
| *G06F 16/955* | (2019.01) |

(52) U.S. Cl.
CPC .......... *A63B 24/0062* (2013.01); *A63B 21/08* (2013.01); *A63B 69/00* (2013.01); *G06F 16/955* (2019.01)

(58) Field of Classification Search
CPC ............ A63B 69/0079; A63B 69/0071; A63B 24/0062; A63B 2024/0065; A63B 2024/0068; A63B 2024/0071
USPC .............................................. 473/430; 482/8
See application file for complete search history.

(56) References Cited

U.S. PATENT DOCUMENTS

| | | | | |
|---|---|---|---|---|
| 3,012,781 | A * | 12/1961 | Nelson .................... | A63B 5/16 248/292.11 |
| 3,023,001 | A * | 2/1962 | Gourdouze ........ | A63B 69/0071 273/331 |
| 3,717,342 | A * | 2/1973 | Haney ................ | A63B 69/0079 473/430 |
| 4,161,313 | A * | 7/1979 | Dickey .............. | A63B 69/0071 273/DIG. 30 |
| 4,352,494 | A * | 10/1982 | Wells ................. | A63B 69/0075 473/449 |
| 4,465,277 | A * | 8/1984 | Dittrich ................ | A63B 63/083 473/447 |
| 5,503,389 | A * | 4/1996 | Campbell ................ | A63B 5/16 473/430 |
| 5,634,872 | A | 6/1997 | Brown et al. | |
| 5,889,270 | A | 3/1999 | Daugherty | |
| 5,916,046 | A | 6/1999 | Allred et al. | |
| 6,334,821 | B1 * | 1/2002 | Kita .................... | A63B 69/0079 473/422 |
| 6,656,096 | B2 * | 12/2003 | Sela ........................ | A63B 1/00 473/472 |
| 7,070,520 | B1 | 7/2006 | An | |

(Continued)

*Primary Examiner* — Joshua T Kennedy
(74) *Attorney, Agent, or Firm* — Norton Rose Fulbright US LLP

(57) ABSTRACT

An apparatus and system for obtaining metrics associated with a user's athleticism are disclosed. The user performs a workout using the apparatus, and the workout is scored based on a scoring system. The scoring system may be objective, thereby facilitating score standardization, and individual users for which scores have been recorded may be ranked by the system. Individual users may associate their system profiles with one or more positions for one or more sports. The rankings may be filtered by position and sport to facilitate identification of one or more users of interest, such as for a college recruiting purposes or professional sports team drafts.

12 Claims, 14 Drawing Sheets

(56) References Cited

U.S. PATENT DOCUMENTS

| | | | | |
|---|---|---|---|---|
| 7,186,193 | B1* | 3/2007 | McFadden, Jr. | A63B 67/10 |
| | | | | 473/459 |
| 7,223,186 | B2* | 5/2007 | Tresvant | A63B 69/0071 |
| | | | | 473/423 |
| 7,530,925 | B2* | 5/2009 | Underwood | A63B 5/16 |
| | | | | 482/148 |
| 7,775,913 | B2* | 8/2010 | Woods | A63B 69/0079 |
| | | | | 473/423 |
| 7,955,222 | B1* | 6/2011 | Hernandez | A63B 5/16 |
| | | | | 482/14 |
| 8,333,671 | B1* | 12/2012 | Wheelbarger | G09B 19/003 |
| | | | | 473/417 |
| 8,649,890 | B2* | 2/2014 | Martin | A63B 71/06 |
| | | | | 700/91 |
| 9,669,261 | B2* | 6/2017 | Eder | G09B 19/0038 |
| 9,861,856 | B1* | 1/2018 | Miller | A63B 21/00178 |
| 2007/0197938 | A1* | 8/2007 | Tyson | A61B 5/1072 |
| | | | | 600/587 |
| 2009/0170675 | A1* | 7/2009 | Giannelli | A63B 23/03533 |
| | | | | 482/139 |
| 2012/0179277 | A1* | 7/2012 | Lymberopoulos | |
| | | | | A63B 71/0616 |
| | | | | 700/91 |
| 2016/0001117 | A1* | 1/2016 | Dufficy | A63B 5/16 |
| | | | | 482/15 |
| 2018/0078192 | A1* | 3/2018 | Chen | G16H 40/63 |

* cited by examiner

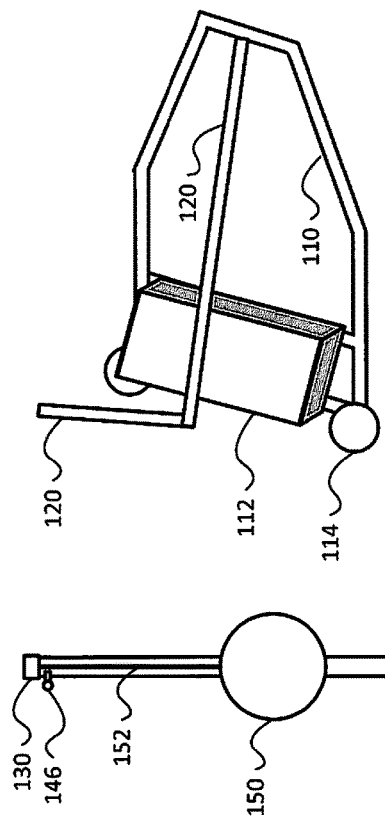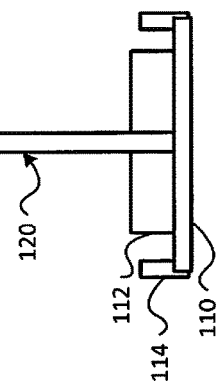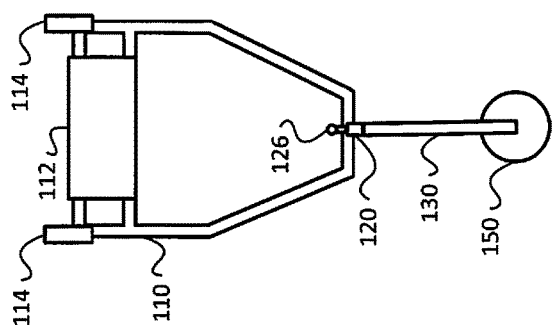

LEAN 7 FITNESS

CLAIM OF PRIORITY

This application claims the benefit of U.S. Provisional Patent Application No. 62/245,237, entitled "GO PRO-FIT," filed on Oct. 22, 2015, the contents of which are expressly incorporated herein by reference in their entirety.

FIELD OF THE DISCLOSURE

The instant disclosure relates to an apparatus, system, and method for obtaining physical fitness data. More specifically, this disclosure relates to an apparatus, system, and method for capturing and standardizing physical fitness data.

BACKGROUND

Evaluation of athletes is one of the toughest challenges in the modern world of sports. From the athletes point of view, the evaluation process is one of the most important parts of their athletic career, as it has a direct impact on whether the athlete is able to transition from playing at the high school level to playing the college level, or transitioning from playing at the college level to the professional level. There are many factors that affect whether an athlete is able to advance from one level to the next in their athletic careers. One important factor is geography, or where the athlete is located. For example, an athlete playing high school football for a team that is well-known for producing college level players is more likely to be evaluated by a college football recruiter and be offered a scholarship than an athlete playing high school football for a less well-known high school in a remote area, such as rural area having a small high school. Thus, the athlete's ability to get "noticed" and advance in his/her athletic career may depend on where the athlete grows up.

One way that athletes attempt to get "noticed" is by creating a "highlight" reel, such as a video that showcases the athlete's abilities and talents using in-game video footage of the athlete. Such "highlight" reels are commonly used today as part of the athletic evaluation process, but suffer from several disadvantages, most notably in the realm of team sports, such as football. For example, a running back on a team with a really good offensive line may be able to put together a lengthy "highlight" reel (e.g., due to really good blocking by his offensive line), while a similarly, or even more skilled, running back playing behind a poor offensive line may not have as many "highlight" reel worthy plays (e.g., due to poor blocking by his offensive line). Thus, a "highlight" reel is not necessarily the most effective tool for evaluating an athlete's ability individually. However, "highlight" reels continue to play a significant role in evaluating talent at both the college and professional levels, especially as a technique for athletes to get noticed (e.g., pique college and professional talent evaluators interest in recruiting/drafting the athlete).

After an athlete has been "noticed," talent evaluators or scouts may investigate the athlete further, such as by attending games that the athlete participates in, to obtain firsthand knowledge of the athlete's abilities. The data obtained through these in person evaluations is then used to make a determination as to whether the evaluator (e.g., the scout, a college athletic team, a professional sports franchise, etc.) believes that the athlete could compete at the next level. Due to the manual nature of such evaluations and the significant number of athletes and teams, many athletes go unnoticed, and are never recruited to play sports beyond the high school level despite being equipped with the necessary talent and ability to play at the college and/or professional level.

Players that are not recruited to play at the college level may overcome their lack of being "noticed" by "walking-on" to a college team (e.g., trying out for the team). However, even this route presents its own set of challenges to the athlete. For example, even when an athlete is able to "walk-on" to a college level team, that player is often not afforded a full or partial scholarship to attend the university. If the athlete cannot afford to pay for his attendance at the university, they are not able to be on the team, which may prevent them from advancing their athletic career.

Athletes that are fortunate enough to play college sports continue to be subjected to evaluations, especially when they attempt to play professional sports. For example, every year the National Football League hosts a "combine" where college football players are subjected to various tests and drills designed to gauge the participants athletic abilities and intelligence in a variety of ways. Data obtained from one-time events, such as the "combine" may have a significant impact on an athlete reaching the next level. For example, in recent years some "combine" participants have performed much stronger than expected and surprises everyone by his performance. These players often experience a significant increase in how they are viewed by NFL teams, and analysts often discuss how such players "stock" is rising, meaning that the player's performance at the combine has improved the likelihood that the athlete will be drafted, or has improved the position in the draft where the player is likely to be drafted. Some people criticize putting too much weight on an athlete's performance at events such as the "combine" because it is a one-time event, and any athlete may have a bad day (e.g., perform poorly). Thus, events, such as the "combine," while providing additional data to evaluate an athlete's abilities, are but one of a variety of tools or sources for data that may be used to evaluate athletes.

SUMMARY

The present disclosure is directed to an apparatus, system, and method for evaluating and ranking athletes across a variety of sports using an objective scoring technique. In an embodiment, the user performs a workout using the apparatus, and the workout is scored based on a scoring system. In an embodiment, the scoring system may be a cloud-based system that enables the user to upload workout data associated with their workouts. The workouts, once uploaded, may allow the user to track their workouts and performance, and may be used by the scoring system to calculate a score and/or rank for the user. Because all workout data provided to the scoring system is representative of the same workout (e.g., all users uploading workout data to the scoring system perform the same workout), the scores and rankings may be objective, thereby facilitating score standardization of each users individual athletic performance and achievement (e.g., how well they performed the workout), and individual users for which scores have been recorded may be ranked by the system. In an embodiment, individual users may associate their system profiles with one or more positions for one or more sports. The rankings may be filtered by position and sport to facilitate identification of one or more users of interest, such as for a college recruiting purposes or professional sports team drafts.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 2A is a diagram illustrating a front view of the apparatus of FIG. 1;

FIG. 2B is a diagram illustrating a top view of the apparatus of FIG. 1;

FIG. 2C is a diagram illustrating the apparatus of FIG. 1 in a folded arrangement;

DETAILED DESCRIPTION

Figure 1:
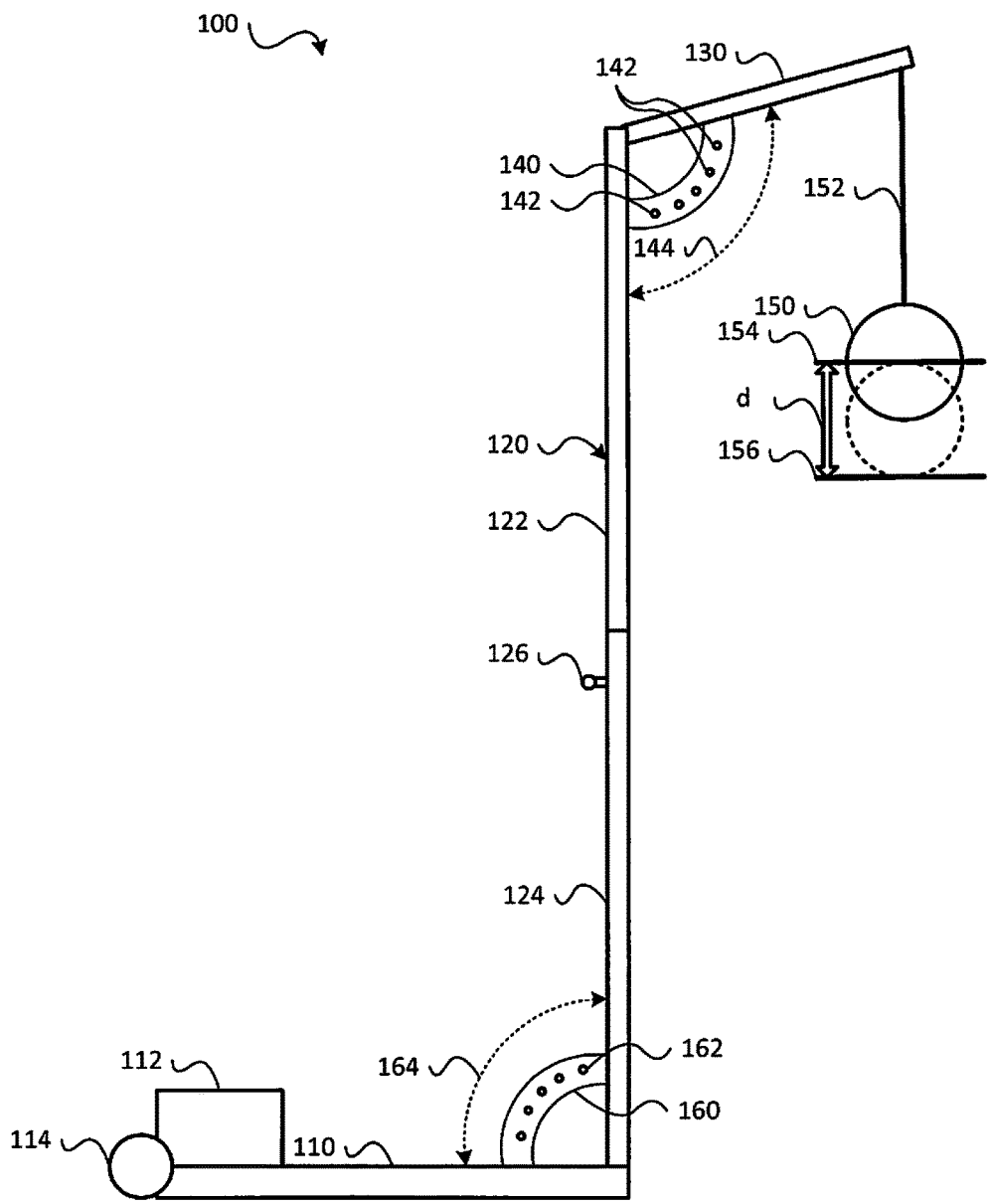
FIG. 1 is a profile view of an embodiment of an apparatus for scoring a user.

Referring to FIG. 1, a profile view of an embodiment of an apparatus for scoring a user is shown as an apparatus 100. In an embodiment, the apparatus 100 may be an assembly comprising a plurality of components, as described in more detail below. As shown in FIG. 1, the apparatus 100 includes a base 110, a first member 120, a second member 130, and an object 150. In an embodiment, at least a portion of the base 110, the first member 120, and the second member 130 may be formed from metal tubing. In an embodiment, the metal tubing may be square and/or rectangular metal tubing. In an additional or alternative embodiment, at least a portion of the base 110, the first member 120, and the second member 130 may be formed from circular metal tubing. In another additional or alternative embodiment, at least a portion of the base 110, the first member 120, and the second member 130 may be formed from a combination of square, rectangular, and circular metal tubing. It is noted that while metal tubing is disclosed for forming at least a portion of the base 110, the first member 120, and the second member 130, all or a portion of these components may be formed from other materials, such as carbon fiber, heavy duty plastics, wood, or other suitable materials, and/or may be formed using materials of different shapes, such as angle iron, depending on the particular construction of the apparatus 100. As shown in FIG. 1, a first end of the first member 120 may be coupled to the base 110, and the second member 130 may be coupled to a second end of the first member 120.

As shown in FIG. 1, the object 150 may be suspended from a second end of the second member 130. In an embodiment, the object 150 may be a ball. For example, the object 150 may be a football, a basketball, a soccer ball, a baseball, a volley ball, or another type of ball. The object 150 may be suspended from the second end of the second member using an attachment means 152. In an embodiment, the attachment means 152 may be a rope, a bungie cord, a wire, a cable, or a combination thereof. In an embodiment, the object 150 may be removably coupled to the attachment means to facilitate changing of the object 150 from a first object type (e.g., a football) to a second object type (e.g., a basketball). For example, a looped piece of cable may be fixedly attached to the object 150, and the attachment means 152 may have a similar arrangement on one end, and a carabiner may be used to couple the object 150 to the attachment means 152. This may enable the apparatus 100 to be customized for evaluation of athletes for particular sports. For example, an athlete training for football may use a football as the object 150, while an athlete training for basketball may user a basketball as the object 150. In an additional or alternative embodiment, the object 150 may remain constant for athletes across all sports (i.e., the object 150 is not changed depending on the sport(s) the athlete plays). This may enable the scores determined from workouts performed with the machine to be standardized across all sports, which may provide a more accurate comparison of athleticism independent of the particular sport an athlete plays.

In an embodiment, the base 110 may comprise a weight 112, and one or more wheels 114. In an embodiment, the weight 112 may be configured as a counterbalance used to maintain the first member 120 and the second member 130 in a desired position during use of the apparatus 100. For example, the weight 112 may be configured to prevent the apparatus 100 from tipping over due to forces, such as gravity or a pulling force applied to the object 150, acting on the second member 130 as it extends away from the first member 120. In an embodiment, the weight 112 may be omitted (e.g., if the base 110 is formed from materials providing sufficient weight to keep the apparatus 100 from tipping over). The wheels 114 may facilitate movement of the apparatus 100. In an embodiment, the apparatus 100 may be folded up to make movement of the apparatus 100 easier, as illustrated in FIG. 2C.

In an embodiment, a pivot assembly 140 may be coupled to the first member 120 and the second member 130. The pivot assembly 140 may facilitate pivoting of the second member 130 relative to the first member 130, as shown by the arrow 144. For example, the first end of the second member 130 may be pivotally coupled (e.g., using a bolt or tie rod) to the second end of the first member 120. As indicated by the arrow 144, when the second member 130 pivots, the second end of the second member 130 may move towards or away from a longitudinal axis of the first member 120. Stated another way, the second member 130 may pivot along the longitudinal axis of the first member 120. In an embodiment, the pivoting of the second member 130 may be restricted to a longitudinal plane corresponding to the longitudinal axis of the first member 120 (e.g., the second member 130 does not rotate about the longitudinal axis of the first member 120). In an embodiment, the pivot assembly 140 may comprise a first portion and a second portion, where the first portion and the second portion are moveable relative to each other. For example, the first portion may be defined by a plate, and the second portion may be a second plate. Each of the portions of the pivot assembly 140 may include one or more holes 142. When one or more of the holes 142 of the first portion of the pivot assembly 140 are aligned with one or more of the holes 142 of the second portion of the pivot assembly 140, a pin (not shown in FIG. 1) may be inserted through the aligned holes 142 to lock the pivot assembly 140 in place. Locking the pivot assembly 140 in place (e.g., by inserting the pin through the aligned holes of the first and second portions of the pivot assembly 140) may lock the orientation of the second member 130 relative to the first member 120. In an embodiment, pivoting of the second member 130 may be used to adjust the height of the object 150. For example, each of the holes 142 of the pivot assembly 140 may cause a change in a distance between the object 150 and a surface upon which the base 110 is positioned. For example, a first pair of the holes 142 may cause the object to be located at a first position, indicated by the arrow 154, and a second pair of holes 142 may cause the object 150 to be relocated to a second position, indicated by the arrow 156. As shown in FIG. 1, the difference between the first position and the second position may be represented by a distance d. Thus, in some embodiments, the pivot assembly 140 may be used to adjust the distance between the object 150 and the surface upon which the base 110 is positioned. In other embodiments, the second member 130 may be fixedly coupled to the first member 120, as described in more detail below with reference to FIGS. 9 and 14.

In an embodiment, the first member 120 may be oriented normal to the base 110. In an additional or alternative embodiment, the first member 120 may be oriented at an angle with respect to the base 110. In still another additional or alternative embodiment, orientation of the first member 120 relative to the base 110 may be adjustable, such as by providing a pivot assembly 160 coupled to the first end of the first member 120 and to the base 110. The pivot assembly 160 may enable the first member 120 to be pivoted relative to the base 110, as indicated by the arrow 164. As described above with respect to the pivot assembly 140, the pivot assembly 160 may be formed in two or more portions, each comprising one or more holes that may be aligned for insertion of a pin to lock the first member 120 into a fixed position. In an embodiment, the pivot assembly 160 and/or the pivot assembly 140 may enable the apparatus 100 to be folded, as illustrated with respect to FIG. 2C, which may enable the apparatus 100 to be transported, stored, and/or relocated more easily.

In an embodiment, the first member 120 may be formed as a sub-assembly including a first portion 122 and a second portion 124. In an embodiment, the first portion 122 and the second portion 124 may be slideable with respect to each other. For example, as explained above, the first member 120 may be formed from square tubing. In such an embodiment, the first portion 122 may be formed from a smaller size tubing than the second portion 124 such that the first portion 122 fits inside of, and is slideable while within, the second portion 124. Each of the first portion 122 and the second portion 124 may comprise one or more holes. Each of the holes may be spaced at predetermined distances with respect to each other, such as every 3 inches, every 6 inches, etc. To facilitate locking of the first portion 122 and the second portion 124 into a desired position, the first member 120 may include a pin 126. A pair of holes (e.g., one hole on the first portion 122 and one hole on the second portion 124) may be aligned, and the pin 126 may be inserted into the holes, thereby locking the first portion 122 into place with respect to the second portion 124. In an embodiment, the holes on the first portion 122 and the second portion 124 may be used to reduce the size of the apparatus 100, such as when the apparatus 100 is being moved. For example, the first portion 122 may be slid into the second portion 124 and locked into place using the pin 126 and the holes. In an embodiment, when the pivot assembly 140 is used to adjust the height of the object 150, the second member 130 may be formed of two or more portions, as described above with respect to the first and second portions 122, 124 of the first member 120. This may enable the object 150 to be positioned a desired distance away from the first member 120, which may be beneficial in some applications.

In an additional or alternative embodiment, the holes of the first portion 122 and the second portion 124 may be used to adjust the height of the object 150. For example, when a first pair of holes are used, the object 150 may be at a first location, as indicated by the line 154, and when a second pair of holes are used, the object 150 may be at a different location, as indicated by the line 156, where the first location and the second location are separated by a distance d. In an embodiment where the object 150's height is adjusted by vertically adjusting the first portion 122 and the second portion 124 of the first member 120, the second member 130 may be fixedly coupled to the second end of the first member 120 (e.g., the pivot assembly 140 may be omitted).

The apparatus 100 may be used to perform a workout, and information associated with the workout may be recorded to enable the person performing the workout to be scored and ranked amongst other users that have performed the workout, as well as to provide a historical record of the user's workout performance. In an embodiment, the workout may be scored using a plurality of metrics. in an embodiment, the workout may require the user to perform a plurality of sets, and, during each set, the user performs as many burpees (also called B-blasters) as they can in one minute. To perform a burpee the user: 1) assumes a standing position; 2) drops into a squat position with his/her hands on the ground; 3) kicks his/her feet back, while keeping his/her arms extended, then doing a push up; 4) immediately returns his/her feet to the squat position; and 5) jumps up from the squat position. During the workout, the user may grab the object 150 after each jump (e.g., step 5). In an embodiment, the plurality of metrics may include a fitness metric, a cardio metric, a vertical leap metric, a weight metric, and an execution metric. The fitness metric may correspond to a number of times that the user successfully performed a rep (e.g., a burpee followed by grabbing the object 150) during the first set. In an embodiment, the fitness metric may represent the user's short-term explosiveness (e.g., how high of a level can the user perform the workout for a short period of time). The cardio metric may correspond to the average number of reps that the user performed during each set of the workout. For example, if the user performed 4 sets, and performed 28, 26, 25, and 22 reps during the 4 sets, respectively, the user's fitness metric would be 28, and the user's cardio metric would be 25 (rounded down from 25.25). In an embodiment, the cardio metric may represent how long the user can sustain his/her short-term explosiveness. In an embodiment, the fitness and cardio metrics may represent the user's ability to play a sport, such as football. For example, users having high fitness metrics, but low cardio metrics, may be suitable for playing a few plays (e.g., their fitness score is high signifying they can perform at a high level for a short period of time), but may require substitution shortly thereafter (e.g., their cardio score indicates that they can only sustain the high level of performance for a short duration of time). The vertical leap metric may be determined based on the distance between the object 150 and the surface that the base 110 is positioned on. For example, a lowest position for the object 150 may correspond to a vertical leap metric of 0, and the vertical leap metric may be increased by a predetermined amount as the position for the object 150 is raised. For example, when the object 150 is raised a first level, a first number of points may be assigned to the vertical leap metric (e.g., 1 point), and when the object 150 is raised to a second, higher level, the vertical leap metric may be assigned a second number (e.g., 2 points). In an embodiment, the vertical leap metric may provide information that may be of interest to particular sports and/or positions within those sports. For example, a person recruiting for a volleyball team may be interested in athletes (e.g., users of the apparatus 100) that have high vertical leap metrics (e.g., scores), while other recruiters for other sports, such as tennis, may not be concerned with vertical leap metric scores. The weight metric may be determined based on an amount of weight added to a weight belt worn by the user when performing the workout. For example, when the user performs the workout without any weight, the weight metric may be zero, but when the user performs the workout wearing a first amount of weight, the weight metric may be assigned a first number of points (e.g., 1 point). If the user adds additional amounts of weight to the weight belt, the weight metric may be increased by an amount proportional to the weight increase (e.g., 1 point per 5 pounds of weight added). In an embodiment, the weight metric may provide additional information that may be relevant to other metrics. For example, assuming that a pool of users all have the same overall scores (e.g., all of the above-metrics), a user having the higher weight metrics may be able to outscore other users having lower weight metrics (e.g., if the weight was removed). In an embodiment, the execution metric may be determined based on how precise the user performs all or a portion of the workout. For example, in an embodiment, the execution metric may be based on the position of the user's body (e.g., hands, feet, etc.) when performing the burpees. In an embodiment, this may indicate the user's ability to control and coordinate their bodies during athletic activities, which may be important for some sports/positions. For example, a first baseman in baseball often has to adjust the position and orientation of their body when fielding a throw to first base, and a high execution metric may indicate that a particular user is able to control his/her body better than a user with a lower execution metric. Embodiments of various accessories for the apparatus 100 that may automatically calculate at least a portion of the execution metric based on the position of the user's body during performance of the workout are described in more detail below with reference to FIGS. 4 and 5. In an additional or alternative embodiment, the execution metric may be determined, based at least in part on how the user grabs the object. For example, in football, a player is supposed to catch the football with his fingers, rather than his palms. To facilitate scoring of the user's execution in a system configured for football, the user may wear gloves that include sensors on the palms of the glove, where the sensors are configured to detect pressure (e.g., pressure from the user grabbing the object 150 with his palms in contact with the object 150, rather than just his fingertips). If the sensors on the gloves detect pressure during the workout, points may not be given for execution, or points may be deducted for execution. Embodiments of an accessory for the apparatus 100 that may automatically calculate at least a portion of the execution metric based on how the user grabs the object 150 during performance of the workout is described in more detail below with reference to FIG. 4. In some embodiments, the execution score may be determined based on other factors.

In an embodiment, once a user has completed a workout with the apparatus 100, the user may initiate transmission of workout data to a remote system for storage or other purposes (e.g., ranking), as described in more detail below with reference to FIG. 6. In an embodiment, the remote system may be a cloud-based system. In an embodiment, the workout data may include information that is representative of the number of times that the user touched the object 150 during the workout (e.g., for each set performed during the workout). The system may provide for storage of the workout data, and may provide additional functionality for processing the workout data. For example, a user may perform a workout, and, upon completing the workout, the user may use a computer or mobile device to login to the system. The system may provide one or more graphical user interfaces (GUIs) that enable the user to interact with the system to perform various operations, such as logging in and uploading the workout data. The system may then calculate a score for the user based on each workout uploaded to the system.

Figure 7:
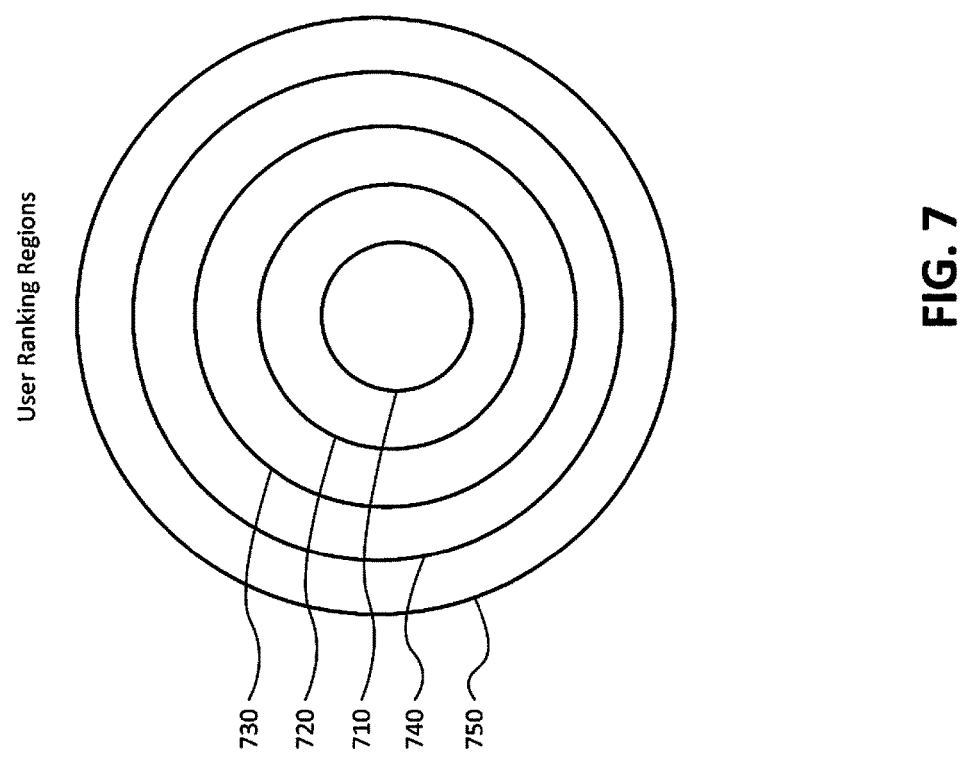
FIG. 7 is a diagram illustrating an exemplary embodiment of a plurality of user groups that a user may be ranked among in accordance with embodiments of the present disclosure.

In an embodiment, the user's score may then be used to rank the user among various groups of other users (e.g., other users performing a workout with an apparatus 100). For example, and referring to FIG. 7, a diagram illustrating an exemplary embodiment of a plurality of user groups that a user may be ranked among in accordance with embodiments of the present disclosure is shown. In an embodiment, the plurality of user groups may include groups associated with: a city 710, a first geographic region 720 (e.g., a region or portion of a state), a state 730, a second geographic region 740 (e.g., a region or group of states of a nation), and nation 750. It is noted that the various groups illustrated in FIG. 7 are provided for purposes of illustration, rather than by way of limitation, and that other groups may be used for ranking purposes in accordance with some of the disclosed embodiments. In an embodiment, the user may select which group(s) he/she desires to be ranked in. For example, the rankings may be provided as part of a subscription a service, where the user pays a first amount to be ranked in the city group 710, and pays a second amount to be ranked in the first geographic region 720, where the second amount is higher than the first amount, and pays a third amount to be ranked in the state 730, where the third amount is higher than the second amount, and so on. In an embodiment, the city 710 may correspond to a city where the user lives. In an additional or alternative embodiment, the city 710 may be a city that is different from the city where the user lives, but for which the user desires to be ranked. For example, a user in a small town may desire to be ranked in a larger city, where there are more athletes that the user can be ranked among. This may enable the user to be ranked in a city where the user desires to attend a particular college, and is therefore, more likely to be noticed by recruiters at that college who may be familiar with the athletes in that city. In still another additional or alternative embodiment, the user may select multiple cities where the user desires to be ranked. In an embodiment, being ranked in more cities may require payment of an additional fee. For example, the user may pay the first amount to be ranked in a first designated city 710, and may pay an additional amount for each additional city 710 that the user desires to be ranked at. As an alternative to selecting multiple cities, the user may instead opt to be ranked in the first geographic region, which may encompass multiple cities in a region of a state. For example, if the user resides in Denton, Tex., the user may opt to be ranked in a northern region of Texas, which may include the cities of Dallas, Fort Worth, Irving, Plano, Arlington, and many other cities. In an embodiment, the user may select multiple ones of the first geographic regions 720. For example, if the user resides in Denton, Tex., the user may opt to be ranked in the northern region of Texas, but may also opt to be ranked in one or more other first geographic regions 720, such as a central region of Texas, a southern region of California, etc. As an alternative to selecting multiple regions within a single state, the user may opt to be ranked in a state 730. For example, if the user resides in Denton, Tex., the user may elect to be ranked among all users in the state of Texas. In an embodiment, the user may opt to be ranked in a state other than the state that the user resides in, or may elect to be ranked in multiple states, such as Texas and California. As an alternative to being ranked in a single state, or paying a higher fee for being ranked in multiple states, the user may elect to be ranked in one of the second geographic regions 740, which may rank the user among users from a plurality of states. For example, if the user resides in Denton, Tex., the user may opt to be ranked in a second geographic region 740 that includes users from Texas, Oklahoma, Louisiana, Arkansas, Kansas, and Missouri. In an embodiment, the user may opt to be ranked in multiple ones of the second geographic regions 740, which may allow the user to be ranked in different geographic areas where the user desires to attend college. A higher fee may be charged if the user desires to be ranked in multiple ones of the second geographic regions 740. As still another alternative, the user may opt to be ranked in the nation 750. For example, a user residing in the United States may opt to be ranked among all users of the apparatus 100 in the United States. Alternatively, the user may opt to be ranked among users of a different country. This may be beneficial for some sports, such as soccer, which are more prominent in countries other than the United States, and may provide the user with an increased chance of having the opportunity to advance their athletic career by playing at the next level. In an embodiment, the user may be automatically ranked in all lower tiers of the hierarchy that are lower than the highest selected rankings category. For example, a user who lives in Denton, Tex., may opt to be ranked in the state of Texas only, and because of this selection, may automatically be ranked in the city of Denton, as well as the northern region of Texas.

Referring back to FIG. 1, the rankings may provide a convenient way for the user to be "noticed" by recruiters. For example, when the user subscribes to the rankings service, the user may create a profile. In an embodiment, the profile may allow the user to create an avatar that may be customized by the user to reflect the appearance or taste of the user. For example, the user may be able to customize the facial features, hair style, hair and eye color, clothes, etc. of their avatar. Additionally, the profile may indicate that the user plays particular sports, as well as the position that the user plays within each of those particular sports. The rankings may be sorted by sport and position, thereby enabling a recruiter to find the highest ranked users at a particular position/sport. For example, a user profile may indicate that the user plays football/running back, and baseball/left field. A recruiter may access the rankings and may filter the ranking based on the positions that the recruiter is searching for. A recruiter searching for a running back, for example, may see the how the user ranks among all running backs for a specified one of the categories described above (e.g., the city 710, the first geographic region 720, the state 730, the second geographic region 740, and/or the nation 750 of FIG. 7). If the user has a high ranking, this may increase the likelihood that the user is "noticed" by the recruiter, which may prompt the recruiter to attend a game that the user is playing in, or otherwise contact, or become interested in contacting, the user for recruiting purposes. This may be especially beneficial for users in smaller, or less well-known schools or areas that recruiters do not often visit or look to for recruiting purposes.

In an embodiment, the rankings may be used as a tool by college recruiters or professional scouts to build a team. For example, college level athletes may use the apparatus 100 as part of their strength and conditioning program, and their scores may be uploaded to the system. A recruiter may then filter the high school rankings to find users that have a particular score that is as close to, or better than their current college level players. For example, if the recruiter has 3 offensive lineman that are graduating this year, the recruiter may filter the rankings of high school players to identify users of the apparatus 100 that play the appropriate offensive lineman positions and that have the same or better scores than the 3 graduating offensive lineman. Any high school level users that are listed in the filtered rankings are likely to have a strength and conditioning level that is similar to the graduating seniors at the college level, which may indicate, to the recruiter, that those users, while still in high school, are likely ready to play football at the college level, thereby enabling the recruiter to plug those players into their college football program and system immediately, rather than having to build up the strength and conditioning of those players over the course of one or more seasons. This may enable recruiter to build his team, maintain talent levels, and compete more quickly, which is very important to college coaches who are often not afforded a lot of time to build a program.

In an additional or alternative embodiment, the rankings may be used by the system to provide a team builder feature that enables college recruiters to emulate other successful programs. For example, a recruiter may look at, or query the system for, the scores and rankings of players at successful athletic programs at other colleges, and seek to recruit players that have scores similar to those of the successful athletic programs at the other colleges. Similarly, professional athletes may use the apparatus 100, and professional scouts and general managers may use the rankings of the professional athletes as a benchmark for drafting and singing players (e.g., college level players, minor league players, free agents, and the like). For example, a team faced with a decision to keep a current player of the team or draft a replacement for that current player may filter the rankings to identify other athletes (e.g., college level players, free agents, undrafted players, etc.) that play the same position, and that have similar scores as the current player. If other athletes are identified by the rankings, the team may then evaluate whether they believe those identified players would be a good fit for the team.

In an embodiment, the rankings may be weighted for particular metrics. For example, a recruiter looking for athletes to recruit as wide receivers may filter the rankings for athletes that have profiled indicating the associated users play the wide receiver position, and may weigh the rankings based on the vertical leap metric component of the users' scores. The weighting may apply adjust the rankings and scores by an amount (e.g., a percentage or predetermined amount) based on the users vertical leap scoring component. This may enable recruiters to tailor highly specialized searches for players having a particular set of skills unique to a specialized position within a sport.

Because the scores for the users of the apparatus 100 are based on the same workout, the scores provide a uniform, objective, or standardized, way to compare athletes that removes some of the subjectiveness that may otherwise obscure player evaluations. For example, at the NFL "combine," wide receivers are often tasked with catching passes thrown by other players (e.g., quarterbacks attending the combine), and are evaluated, at least in part, on how well they catch the passes. Because the passes are thrown by other people, some players may be thrown better passes than others, making those players look better despite the fact that the accuracy of the pass is outside of the wide receivers control. Thus, such drills are subjective. In contrast, every score provided by the ranking system of embodiments is based on a workout performed using the apparatus 100 which is the same for all users, and entirely in the control of each individual user. This means that the user rankings provided by the present disclosure can compare athletes objectively, with little or no bias, thereby enabling comparison of athletes across a single level of athletics (e.g., comparing high school athletes to other high school athletes, etc.), or across different levels of athletics (e.g., comparing high school athletes to college athletes, comparing college athletes to professional athletes, etc.).

In an embodiment, the rankings may provide additional information about a particular user. For example, if a user's score piques the interest of a recruiter, the recruiter may view a history of the user's workouts and scores. This provides a historical look at the user's work ethic that provides a glimpse into how hard, or how often the user trains, the user's progress over time, or other information that may be of value to the recruiter. Having a historical view of the user's workouts provides an overall view of the user and his/her athleticism, which is in contrast to many of the tools presently available for evaluating athletes. For example, a highlight reel only shows the user's best moments, and is highly biased in an effort to present the athlete in the best light.

In an embodiment, the historical scores may be used to identify trends for athletes that may assist with identifying users that have the potential to reach the same levels of athletic achievement as well known athletes. For example, if a user begins using the apparatus 100 to record workout data while in elementary school, and continues to use the apparatus 100 throughout their athletic career, and achieves great success at the professional level, that user's workout data may provide a historical trend that may be used to identify other athletes that have the potential to achieve similar success at the professional level (e.g., by identifying other users that have historical workout data that correlates to the historical workout data of the successful athlete). This may allow recruiters to more accurately identify athletes that have a high athletic potential. Thus, the apparatus 100, and the accompanying system for ranking its users provides a new and unique recruiting and athletic evaluation tool that may be easily accessible to users in all areas, including players that play for smaller schools, or that play for less well-known organizations, and that may enable athletes in less well-known areas to be "noticed" and advance their athletic careers. Additional aspects of embodiments of the apparatus 100 and its accompanying system for ranking users are described below.

FIGS. 2A and 2B are diagrams illustrating a front view, and a top view, respectively, of the apparatus of FIG. 1. FIG. 2C is a diagram illustrating the apparatus of FIG. 1 in a folded arrangement. When in the folded arrangement, the apparatus 100 may be easily moved by rolling the apparatus 100 on the wheels 114. Additionally, the folded arrangement shown in FIG. 2C may be used for storage of the apparatus 100.

Figure 3:
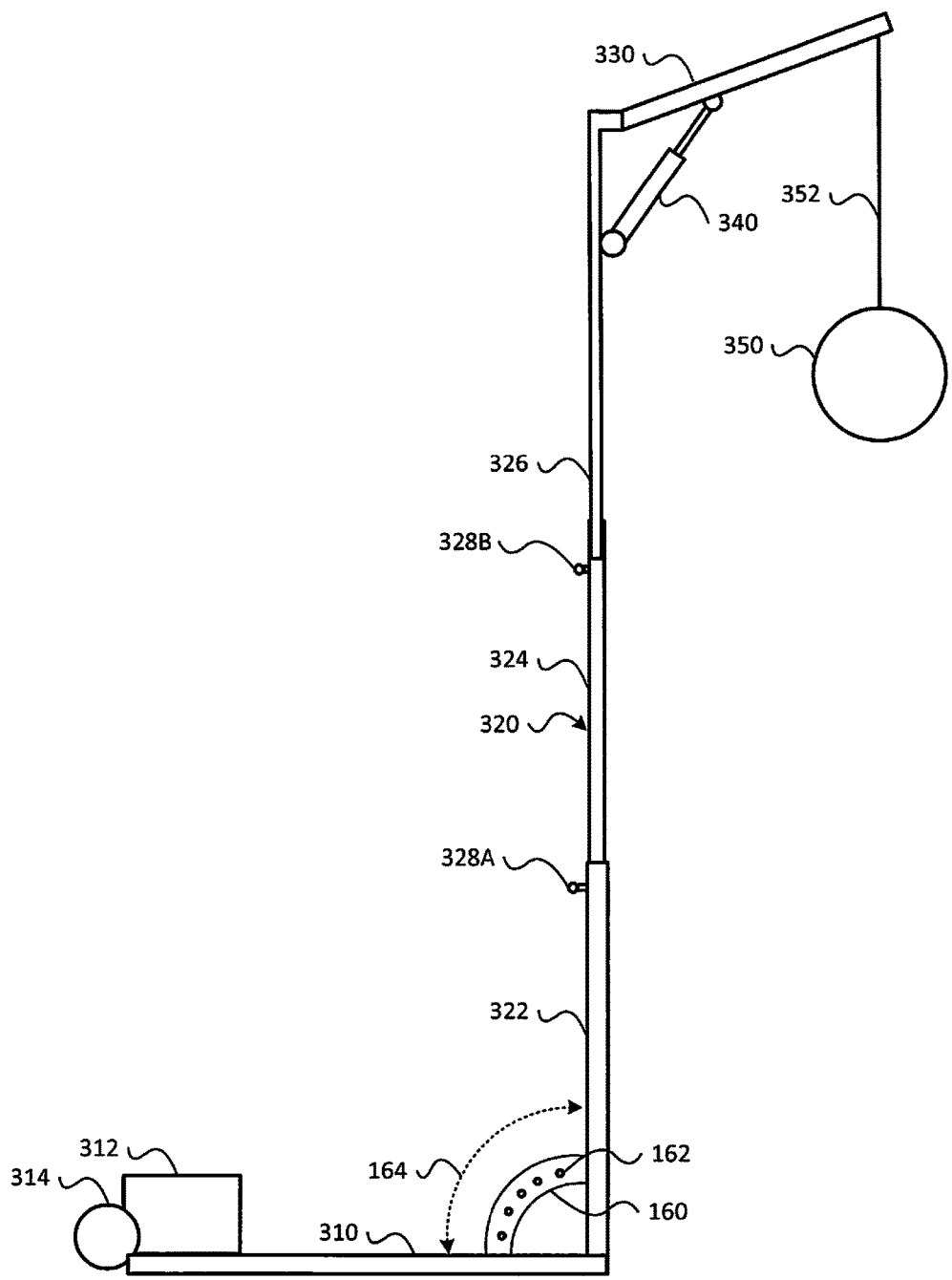
FIG. 3 is a diagram illustrating a profile view of another embodiment of an apparatus for scoring a user.

Referring to FIG. 3, a diagram illustrating a profile view of another embodiment of an apparatus for scoring a user is shown as an apparatus 300. In an embodiment, the apparatus 300 may be an assembly comprising a plurality of components, as described in more detail below. As shown in FIG. 3, the apparatus 300 includes a base 310, a first member 320, a second member 330, a piston 340, and an object 350. In an embodiment, at least a portion of the base 310, the first member 320, and the second member 330 may be formed from metal tubing. In an embodiment, the metal tubing may be square and/or rectangular metal tubing. In an additional or alternative embodiment, at least a portion of the base 310, the first member 320, and the second member 330 may be formed from circular metal tubing. In another additional or alternative embodiment, at least a portion of the base 310, the first member 320, and the second member 330 may be formed from a combination of square, rectangular, and circular metal tubing. It is noted that while metal tubing is disclosed for forming at least a portion of the base 310, the first member 320, and the second member 330, all or a portion of these components may be formed from other materials, such as carbon fiber, heavy duty plastics, wood, or other suitable materials, and/or may be formed using materials of different shapes, such as angle iron, depending on the particular construction of the apparatus 300. As shown in FIG. 3, a first end of the first member 320 may be coupled to the base 310, and the second member 330 may be coupled to a second end of the first member 320.

As shown in FIG. 3, the object 350 may be suspended from a second end of the second member 330. In an embodiment, the object 350 may be a ball. For example, the object 350 may be a football, a basketball, a soccer ball, a baseball, a volley ball, or another type of ball. The object 350 may suspended from the second end of the second member using an attachment means 352. In an embodiment, the attachment means 352 may be a rope, a bungie cord, a wire, a cable, or a combination thereof. In an embodiment, the object 350 may be removably coupled to the attachment means to facilitate changing of the object 350 from a first object type (e.g., a football) to a second object type (e.g., a basketball), as described above with respect to FIG. 1. This may enable the apparatus 300 to be customized for evaluation of athletes for particular sports. In an additional or alternative embodiment, the object 350 may remain constant for athletes across all sports (i.e., the object 350 is not changed depending on the sport(s) the athlete plays). This may enable the scores determined from workouts performed with the machine to be standardized across all sports, which may provide a more accurate comparison of athleticism independent of the particular sport an athlete plays.

In an embodiment, the base 310 may comprise a weight 312, and one or more wheels 314. In an embodiment, the weight 312 may be configured as a counterbalance used to maintain the first member 320 and the second member 330 in a desired position during use of the apparatus 300. For example, the weight 312 may be configured to prevent the apparatus 300 from tipping over due to forces, such as gravity, acting on the second member 330 as it extends away from the first member 320. In an embodiment, the weight 312 may be omitted (e.g., if the base 310 is formed from materials providing sufficient weight to keep the apparatus 300 from tipping over). The wheels 314 may facilitate movement of the apparatus 300. In an embodiment, the apparatus 300 may be folded up to make movement of the apparatus 300 easier, as described above with respect to FIGS. 1-2C.

In an embodiment, the second member 330 may pivot with respect to the first member 320. For example, the first end of the second member 330 may be pivotally coupled (e.g., using a bolt or tie rod) to the second end of the first member 320. When the second member 330 pivots, the second end of the second member 330 may move towards or away from a longitudinal axis of the first member 320. Stated another way, the second member 330 may pivot along the longitudinal axis of the first member 320. In an embodiment, the pivoting of the second member 330 may be restricted to a longitudinal plane corresponding to the longitudinal axis of the first member 320 (e.g., the second member 330 does not rotate about the longitudinal axis of the first member 320). In an embodiment, the pivoting may be limited or restricted by the piston 340. For example, during a workout, the user may grab and pull down the object 350, causing the second member 330 to pivot downwards, and, upon releasing the object 350, the piston 340 may cause the second member 330 to return to its normal position. In an embodiment, the apparatus 300 may include a sensor (not shown in FIG. 3) that is communicatively coupled a computer-based system (not shown in FIG. 3). The sensor that may be configured to detect compression of the piston 340, and, in response to detecting compression of the piston 340, may communicate with the computer-based system to record a repetition (e.g., the user has successfully completed 1 rep of the workout). Thus, the sensor and computer-based system may be used to automate recording of workout data for the user. In an embodiment, the computer-based system may be integrated with the apparatus 300. For example, the apparatus 300 may include a processor and a memory, and the processor may communicate with the sensor using a wired or wireless connection (e.g., a Bluetooth connection, or another wireless connection according to another wireless communication protocol). In an embodiment, the computer-based system may include a wireless transceiver that enables the computer-based system to communicate with a remote server (e.g., a workout rankings server) via a network. Aspects of an embodiment of an apparatus including with a computer-based system are illustrated and described below. In an additional or alternative embodiment, the computer-based system may be a wireless communication device of the user, such as a smartphone, a PDA, or tablet computing device. In such an embodiment, the apparatus 300 may further include a wireless transceiver that is configured to communicate with the wireless communication device of the user to record the workout data. The wireless communication device may then communicate the workout data to the server over a network (e.g., a cellular or other type of wireless network) for ranking purposes. Aspects of an embodiment of an apparatus configured to communicate with an external computer-based system are illustrated and described below.

In an embodiment, the first member 320 may be oriented normal to the base 310. In an additional or alternative embodiment, the first member 320 may be oriented at an angle with respect to the base 310. In still another additional or alternative embodiment, orientation of the first member 320 relative to the base 310 may be adjustable, such as by pivotally coupling to the first end of the first member 320 and to the base 110 and providing the pivot assembly 160 of FIG. 1. The pivot assembly 160 may enable the first member 320 to be pivoted relative to the base 310, as indicated by the arrow 164. As described above with respect to FIG. 1, the pivot assembly 160 may be formed in two or more portions, each comprising one or more holes that may be aligned for insertion of a pin to lock the first member 120 into a fixed position. In an embodiment, the pivot assembly 160 may enable the apparatus 300 to be folded, which may enable the apparatus 300 to be transported and/or relocated more easily, and may simplify storage of the apparatus 300.

In an embodiment, the first member 320 may be formed as a sub-assembly including a first portion 322, a second portion 324, and a third portion 326. In an embodiment, the first portion 322 and the second portion 324 may be slideable with respect to each other, as explained above with respect to the first portion 122 and the second portion 124 of FIG. 1. Similarly, the third portion 326 and the second portion 324 may be slideable with respect to each other. Each of the first portion 322, the second portion 324, and the third portion 326 may comprise one or more holes. Each of the holes may be spaced at predetermined distances with respect to each other, such as every 3 inches, every 6 inches, etc. To facilitate locking of the first portion 322 and the second portion 324 into a desired position, a pin 328A may be provided. A pair of holes (e.g., one hole on the first portion 322 and one hole on the second portion 324) may be aligned, and the pin 328A may be inserted into the holes, thereby locking the first portion 322 into place with respect to the second portion 324. Similarly, the second portion 324 and the third portion 326 may be locked into a desired position using a pin 328B. In an embodiment, the holes on the first portion 322, the second portion 324, and the third portion 326 may be used to reduce the size of the apparatus 100, such as when the apparatus 100 is being moved. For example, the second portion 324 may be slid into the first portion 322, and the third portion 326 may be slid into the second portion 324, and locked into place using the pin 328A and respective ones of the holes.

In an embodiment, the holes of the second portion 324 and the third portion 326 may be used to adjust the height of the object 350. For example, when a first pair of holes are used, the object 350 may be at a first location, and when a second pair of holes are used, the object 350 may be at a different location, as described with respect to FIG. 1.

Figure 4:
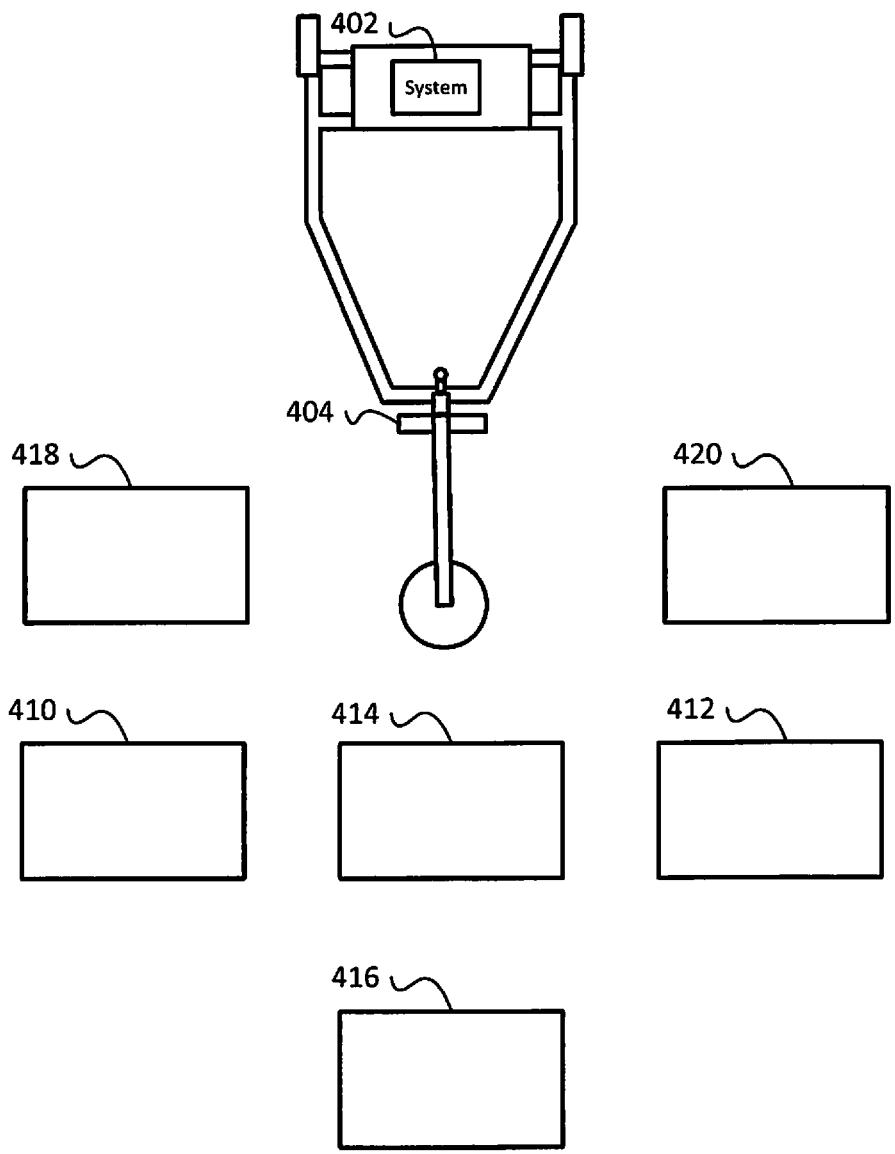
FIG. 4 is a block diagram illustrating various accessory devices that may be used in connection with performing a workout in accordance with embodiments of the present disclosure.

Referring to FIG. 4, a block diagram illustrating various accessory devices that may be used in connection with performing a workout in accordance with embodiments of the present disclosure are shown. As shown in FIG. 4, a workout using a workout apparatus of the present disclosure (e.g., the apparatus 100 of FIG. 1 or the apparatus 300 of FIG. 3) may be performed using various accessory devices, such as hand placement sensors 410, 412, feet placement sensors 414, 416, and gloves 418, 420. In FIG. 4, the apparatus is shown as including a system 402, and a display 404. The display 404 may be mounted to the first member, and may be used to provide information to the user, such as instructions, notifications, or other information (e.g., rankings information, etc.). In an embodiment, the display 404 may be a touch-screen display device, and may further be configured to receive information from the user, such as login information. The system 402 may include a processor, a memory, and a communication interface. In an embodiment, the memory may store instructions that, when executed by the processor, cause the processor to perform operations for communicating information to the user, and/or receive and process information from the accessory devices of the apparatus. The communication interface may enable the system 402 to communicate with an external system, such as a cloud-based system including a server that provides ranking and scoring of user workouts, as described below with reference to FIG. 6. It is noted that particular locations of the system 402 and the display 404 are provided for purposes of illustration, rather than by way of limitation, and that the system 402 and display 404 may be provided at different locations, or may be integrated into a single unit, depending on the particular design and construction of the workout apparatus.

The hand placement sensors 410, 412 may be positioned at desired locations on a surface that the apparatus is resting on, such as a floor, where the locations correspond to areas where the user should place his hands when performing the pushup portion of his burpees. In an embodiment, the hand placement sensors 410, 412 may be mats formed from a soft material, such as rubber or foam, and comprise one or more sensors configured to detect pressure or force applied to the mats when the user performs the pushup portion of his/her burpee. The foot placement sensor 414 may be a mat formed from a soft material, such as rubber or foam, and may comprise one or more sensors configured to detect pressure or force applied to the mat when the user performs the jump at the end of his/her burpee. In an embodiment, the foot placement sensor 414 may be positioned below the object. The foot placement sensor 416 may be a mat formed from a soft material, such as rubber or foam, and may comprise one or more sensors configured to detect pressure or force applied to the mat by the user's feet when he/she performs the pushup portion of his/her burpee. The accessory devices 410-416 may be used to ensure that the user has proper technique when performing the workout. For example, if the user's feet are not detected by the foot placement sensor 416 during the workout, the user may not have performed his/her burpees properly. When this occurs, the user may be notified that the workout was performed improperly, and may be prompted to re-perform the workout. In an embodiment, the notification may indicate which portion of the workout was not performed properly, and may indicate how the workout is to be performed in order to receive credit for the workout (e.g., for scoring and ranking purposes). In an embodiment, the system 402 and the display 404 may be utilized for providing the notifications to the user. For example, the notification may be displayed at the display device 404. In an additional or alternative embodiment, the notification may be provided to the user's wireless communication device using a transmission in accordance with a wireless communication protocol, as described above with reference to FIG. 3 (e.g., using a Bluetooth protocol). Providing the notifications and instructions to the user on how to perform the workout properly using the sensors 410-416 may further increase the uniformity provided by the rankings and scoring system. In an embodiment, instead of having to redo the workout, the user may receive a lower score for the workout. For example, as explained above, in some embodiments, the user's workout score may include an execution component. When the user fails to execute the burpees properly, as determined by the sensors 410-416, the user may receive a lower amount of points for the execution component that they would receive if they executed the burpees properly.

The gloves 418, 420 may include one or more sensors located in the palm of the gloves, and the sensors may be configured to detect pressure or force applied to the sensors when the user's palms contact the object 350. This may be used to capture data that may be used to score the workout in some ranking systems. For example, as explained above, the user's score may include an execution component. If the sensors in the gloves 418, 420 detect a threshold amount of pressure, this may indicate that the user grabbed the object with his/her palms, rather than his/her fingertips, which may reduce the amount of points awarded for execution component of the workout score. In an embodiment, each of the sensors included in the accessory devices 410-420 may be coupled to wireless transceiver that is in communication with the computer-based system of the apparatus 300. For example, each of the accessory devices 410-420 may include a Bluetooth transceiver that communicates with the computer-based system of the apparatus 300.

Figure 5:
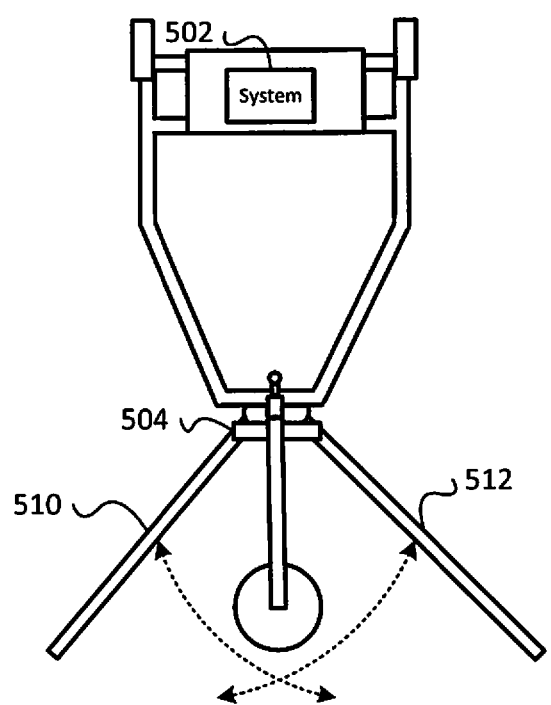
FIG. 5 is a block diagram illustrating additional accessory devices that may be used in connection with performing a workout in accordance with embodiments of the present disclosure.

Referring to FIG. 5, a block diagram illustrating additional accessory devices that may be used in connection with performing a workout in accordance with embodiments of the present disclosure are shown. As shown in FIG. 5, a workout apparatus of the present disclosure (e.g., the apparatus 100 of FIG. 1 or the apparatus 300 of FIG. 3) may include arms 510 and 512. In an embodiment, the arms 510, 512 may be coupled to the first member of the apparatus, and may be configured to pivot towards the object suspended from the second member of the apparatus. In FIG. 5, the apparatus is shown as including a system 502, and a display 504. The display 504 may be mounted to the first member, and may be used to provide information to the user, such as instructions, notifications, or other information (e.g., rankings information, etc.). In an embodiment, the display 504 may be a touch-screen display device, and may further be configured to receive information from the user, such as login information. The system 502 may include a processor, a memory, and a communication interface. In an embodiment, the memory may store instructions that, when executed by the processor, cause the processor to perform operations for communicating information to the user, and/or receive and process information from the accessory devices of the apparatus. The communication interface may enable the system 502 to communicate with an external system, such as a cloud-based system including a server that provides ranking and scoring of user workouts, as described below with reference to FIG. 6. It is noted that particular locations of the system 502 and the display 504 are provided for purposes of illustration, rather than by way of limitation, and that the system 502 and display 504 may be provided at different locations, or may be integrated into a single unit, depending on the particular design and construction of the workout apparatus.

In an embodiment, the arms 510, 512 may be formed of foam surrounding a plastic or metal frame, and may be configured to contact the user as the user jumps from his/her burpee to grab the object. This may simulate an in-game condition, such as being hit while trying to catch a football, or trying to get a rebound in basketball. By contacting the user as he/she attempts to grab the object, the user is trained to focus on grabbing the object despite the contact made by one or more of the arms 510, 512. This may help the user overcome the fear of being contacted while performing an athletic activity (e.g., receiving a football, rebounding a basketball, etc.). In an embodiment, the workout data used to score and rank the user may include information that indicates whether, on a particular rep, the user successfully grabbed the object despite being contacted by one or more of the arms 510, 512, and such data may be used to calculate at least a portion of the execution component of the user's score and ranking for at least one sport.

In an embodiment, the system 502 may be programmed to randomly determine which particular ones of the arms 510, 512 should be used to make contact with the user during the workout. In an embodiment, the apparatus may include a series of lights (not shown in FIG. 5), and the lights may be lit up by the system 502 to designate which arm(s) should be used to contact the user. A trainer or person supervising the workout may then push the arms to cause the arm(s) to contact the user. In an additional or alternative embodiment, the arms 510, 512 may be coupled to actuators or other mechanical components configured to pivot the arm(s) to contact the user during the workout, and the actuator or other mechanical components may be controlled by the system 502 automatically.

Figure 6:
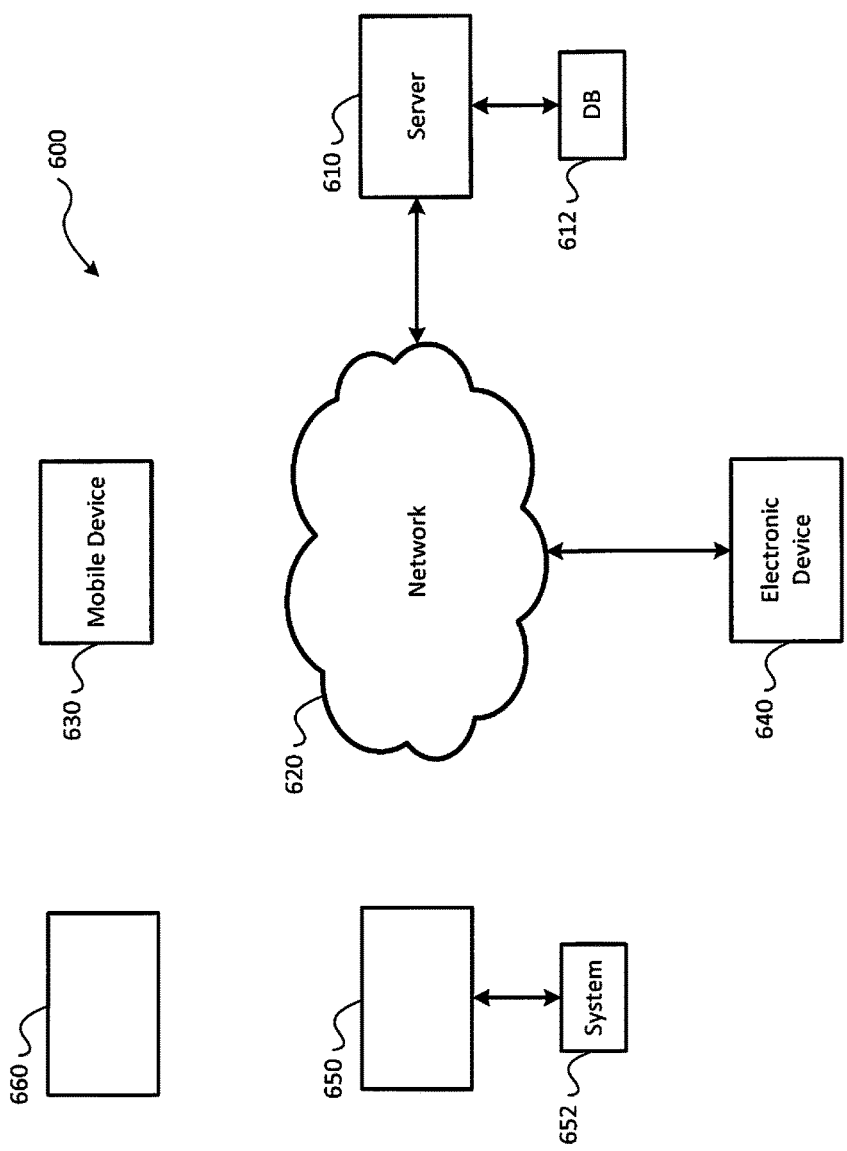
FIG. 6 is a block diagram illustrating various aspects of a system for providing scoring and ranking of user workouts in accordance with embodiments of the present disclosure.

Referring to FIG. 6, a block diagram illustrating various aspects of a system for providing scoring and ranking of user workouts in accordance with embodiments of the present disclosure is shown as a system 600. As shown in FIG. 6, the system 600 includes a server 610, and a database 612. The server 610 may be communicatively coupled to one or more external devices via a network 620. For example, the network 620 may communicatively couple the server 610 to a mobile device 630, to an electronic device 640, and to an apparatus 650.

In an embodiment, the mobile device 630 may be a mobile device of a user, such as smartphone, a personal digital assistant (PDA), a laptop computing device, a tablet computing device, etc. In an embodiment, an application may be installed on the mobile device 630, and may provide various GUIs that enable the user of the mobile device 630 to record workout data, and provide the workout data to the server 610. For example, the user of the mobile device 630 may perform a workout using a workout apparatus in accordance with embodiments of the present disclosure, and workout data representative of the workout may be input to the application executing on the mobile device 630. In an embodiment, the workout data may be provided to the mobile device 630 by the apparatus. For example, if the user performs the workout using the apparatus 650, which includes a system 652, the system 652 may automatically capture data associated with the workout (e.g., from sensors and/or accessory devices of the apparatus 650), and provide the workout data to the mobile device 630. In an additional or alternative embodiment, the apparatus 650 may provide the workout data directly to the server 610. In another additional or alternative embodiment, the workout may be performed using a workout apparatus 660, which does not include a system for automatically capturing workout data, and the workout data may be manually entered at the mobile device 630 using one or more GUIs provided by the application. The workout data may be provided to the server 610, and the server 610 may store the workout data in the database 612.

Subsequently, a recruiter may access the workout data stored in the database 612 using the electronic device 640. For example, the recruiter may access a web page providing a portal to the server 610 and the database 612 to search for athletes that the recruiter may want to recruit. The server 610 may provide various functionality that may be used to present workout rankings to the recruiter via the web page. For example, the server 610 may enable the recruiter to view rankings of users that play a particular sport, or that play a particular position. Additionally, the server 610 may provide functionality that enables the recruiter to build a team. For example, as explained above, the recruiter may designate a team or a portion of a team (e.g., offensive line) associated with a particular organization, and then search through the rankings for users that have scores that are similar to the designated team or portion of the team. The recruiter may then view the workout scores and historical data for all users returned in the search results, and may determine whether to recruit one or more of those users.

In an embodiment, the database 612 may store more than workout data and rankings information. For example, in an embodiment, the database 612 may store academic information that indicates academic requirements for various colleges. When a high school athletes inputs his/her profile data, they may also indicate one or more colleges of interest. Once the user has designated that information, the server 610 may provide the user with academic requirements information that indicates the threshold academic requirements that he user must satisfy before they can attend the indicated colleges. As the user progresses through high school, the user may be required to input his/her grades, and the server 610 may periodically provide notifications to the user that indicate how the user stands academically with respect to the designated colleges. This may increase the user's desire to maintain a threshold grade point average (GPA) (e.g., a GPA that would enable that user to attend a college of interest if they are recruited for athletic purposes). Thus, the system 600 may promote better academic achievements by its users in addition to promoting better athletic achievements. Additionally, by providing the notifications of the academic requirements, the user is able to better evaluate the likelihood that the user can attend a particular college. For example, some colleges have very high academic requirements that must be met despite a user's athletic abilities and achievements. Thus, the system 600 provides the user with a realistic view of how they may advance their athletic career, and emphasizes that grades are just as important as athletics.

In an embodiment, the system 600 may also provide other ways to incentivize users to improve their performance. For example, in an embodiment, the system 600 may provide a series of online sports games, where a user creates a team and the user may be a player on the team. To promote an active lifestyle, the user's workout data may be used to increase the team's, or the player's, in-game ratings or abilities. For example, as the user improves their workouts (e.g., by adding weight, increasing the height of the object, increasing the number of reps, etc.), the representation of the user in-game may become stronger, faster, jump higher, etc. In addition, the games may promote academic achievements, such as by providing improved in-game performance for good grades, etc., thereby further incentivizing the user to maintain focused on his academic studies. In an embodiment, that user's GPA may be used to limit access to the game(s). For example, users that do not satisfy a threshold GPA may be locked out of the games provided by the system 600, and/or from viewing rankings information. Thus, if the user's grades drop below the threshold, the user may continue to upload workout data, but that user would not be allowed access to the games provided by the system 600.

As another example, the system 600 may provide a series of fantasy based sports games, where a user can draft a team players from among the ranked users of the system 600, and then compete against other teams created by other users. This may promote workouts for persons other than athletes. For example, people may workout with an apparatus of embodiments to measure their fitness as compared to other users in similar demographic categories (e.g., age, gender, occupation, etc.), and the desire to be drafted to a team may cause the user to work out more often, or train harder during workouts.

Figure 8:
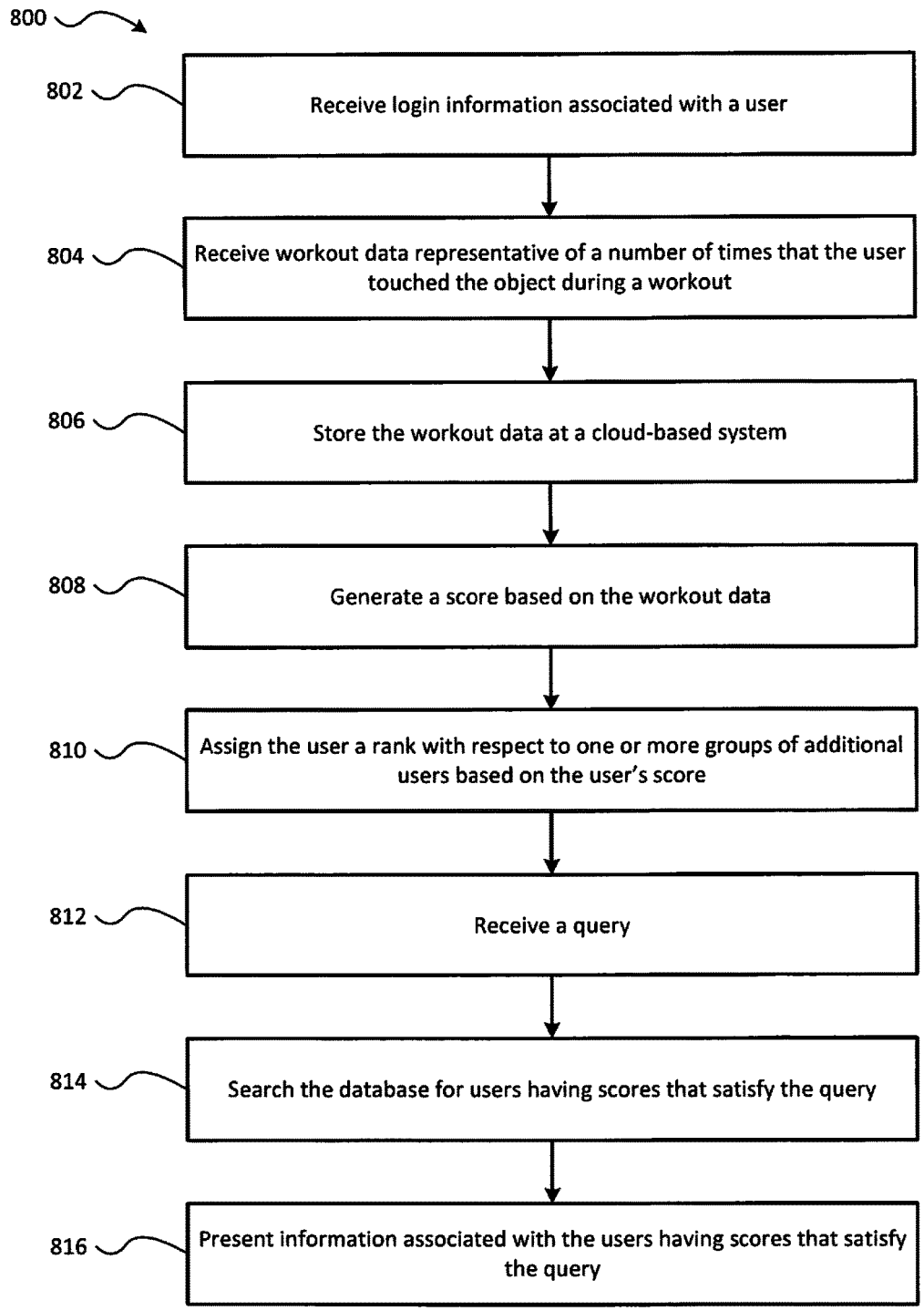
FIG. 8 is a flow diagram of an embodiment of a method for capturing and using workout data.

Referring to FIG. 8, a flow diagram of an embodiment of a method for capturing and using workout data is shown as a method 800. In an embodiment, the method 800 may be performed in a system, such as the system 600 of FIG. 6. In an embodiment, the method 800 may facilitate capturing of workout data, and the workout data may then be scored and used to rank users for various purposes, such as for recruiting and drafting athletes, or for providing one or more of the games designed to promote health and fitness, as described above with respect to FIG. 6. In an embodiment, the method 800 may be stored as instructions at a memory of a server (e.g., the memory of the system 600 of FIG. 6), and, when the instructions are executed by a processor (e.g., the processor of the system 600 of FIG. 6), the processor may perform operations corresponding to various portions of the method 800.

At 802, the method 800 includes receiving login information associated with a user, and, at 804, receiving workout data representative of a number of times that the user touched an object during a workout. In an embodiment, the workout may be performed using the apparatus 100 of FIG. 1, or the apparatus 300 of FIG. 3. In an embodiment, the login information and workout data may be received from a mobile device of the user. In an additional or alternative embodiment, the login information and workout data may be received at a system integrated with a workout apparatus, such as the workout apparatuses illustrated in FIGS. 4 and 5. At 806, the method 800 includes storing the workout data at a database. In an embodiment, the database may be the database 612 of FIG. 6.

At 808, the method 800 includes generating a score based on the workout data. In an embodiment, the score may represent a fitness level of the user. In an embodiment, the score may include various scoring components, such as the fitness component, the cardio component, the weight component, the height component, and the execution component described with reference to FIG. 1. In an additional or alternative embodiment, another scoring technique may be used. At 810, the method 800 includes assigning the user a rank with respect to one or more groups of additional users based on the user's score. In an embodiment, the one or more groups of additional users may correspond to users in a: city, first geographic region, state, second geographic region, nation, or a combination thereof, as described with reference to FIG. 7.

At 812, the method 800 includes receiving a query. In an embodiment, the query may be a request to find users in a particular area, such as one of the geographic areas described with reference to FIG. 7. In an additional or alternative embodiment, the query may be a request to identify users that play a particular position or sport, as described above with respect to FIGS. 1 and 6. In another additional or alternative embodiment, the query may be a request to find users that have scores similar to one or more designated athletes, as described above with reference to replacing graduating players on a college football team. In still another additional or alternative embodiment, the query may include an academic component to filter ranked players based on an academic requirement. In an embodiment, the query may be received from a recruiter associated with a sports team.

At 814, the method 800 includes searching the database for users having scores that satisfy the query. For example, when the query is a team builder query specifying one or more players to emulate to build a team, the database may be searched for users having scores similar to those of the one or more specified players, thereby allowing the searcher to locate or identify users that have scores similar to those of the specified players, which may allow the searcher to build a team having players that are of similar athletic ability to the specified players. At 816, the method 800 includes presenting information associated with the users having scores that satisfy the query. In an embodiment, the information may correspond to a list of high school athletes, which may be used to identify athletes for recruiting purposes. In an additional or alternative embodiment, the information may correspond to a list of college and/or professional athletes, which may be used to identify athletes for draft and/or free agency signing purposes. In embodiments, the information may be weighted according to a particular component of the users' scores, such as one of the metrics. In embodiments, the method 800 may include other data processing and rankings processes and functionality, such as the various processes and functionality described above with respect to FIGS. 1-7.

Figure 9:
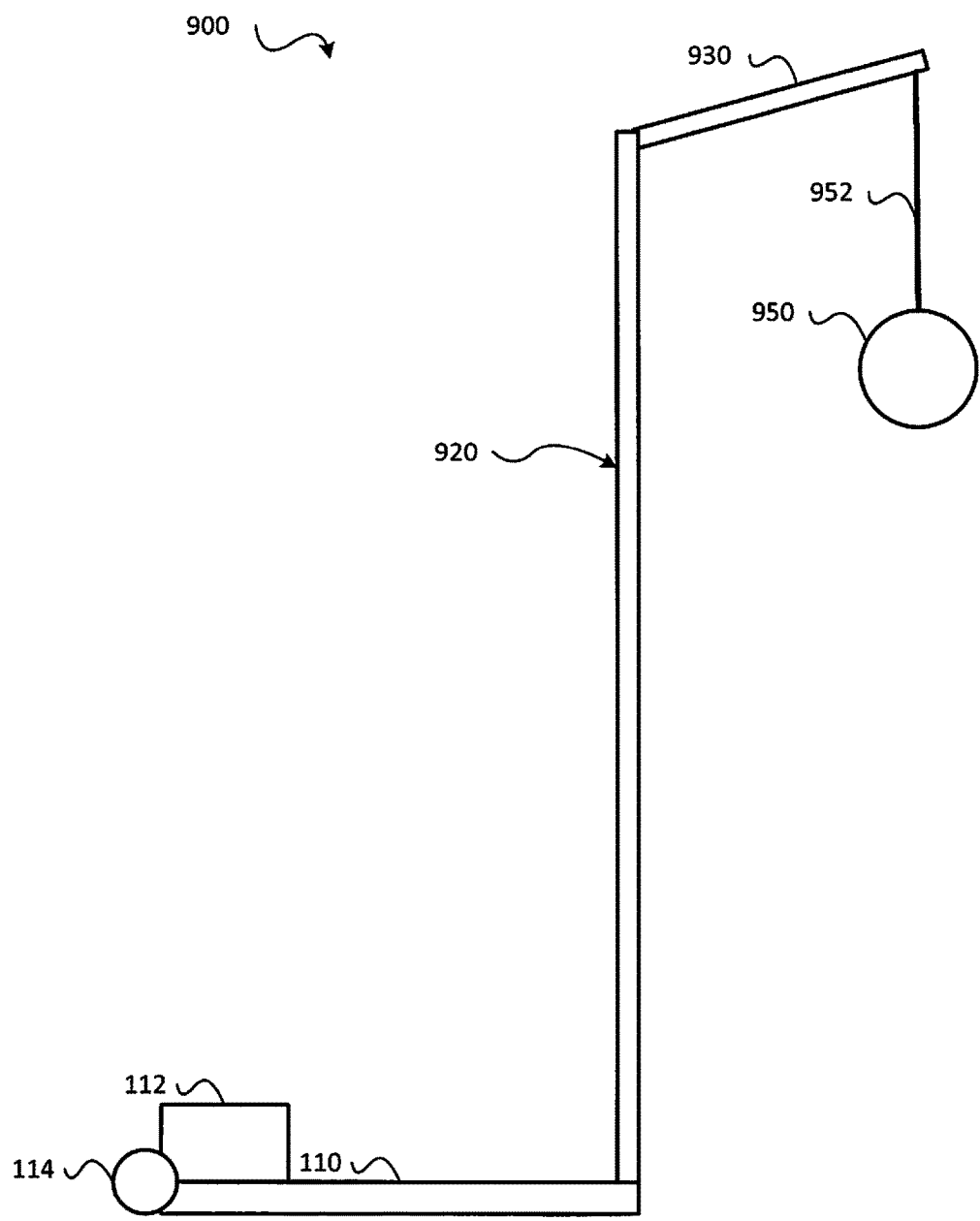
FIG. 9 is a block diagram of an embodiment of an apparatus for scoring a user.

Referring to FIG. 9, a block diagram of an embodiment of an apparatus according to an embodiment of the present disclosure is shown as an apparatus 900. As shown in FIG. 9, the apparatus 900 includes the base 110 of FIG. 1, which may include the weight 112, and one or more wheels 114. Additionally, as shown in FIG. 9, the apparatus 900 may include a first member 920, a second member 930, and an object 950 suspended from an end of the second member 930 using an attachment means 952. In an embodiment, the attachment means 952 may be the attachment means 152 of FIG. 1 or the attachment means 352 of FIG. 3, and the object 950 may be the object 150 of FIG. 1 or the object 350 of FIG. 3. In an embodiment, the first member 920 and the second member 930 may be substantially similar to the first member 120 and the second member 130, respectively, described above with reference to FIG. 1. However, in the embodiment illustrated in FIG. 9, a first end of the first member 920 may be fixedly attached (e.g., using bolts, welds, or other fixation techniques) to the base 110, and a first end of the second member 930 may be fixedly attached (e.g., using bolts, welds, or other fixation techniques) to a second end of the first member 920. In the embodiment illustrated in FIG. 9, a user may perform a workout and record the workout data using a mobile communication device, as described above with reference to FIGS. 1-8. The workout data may then be stored at a remote database (e.g., the database 612 of FIG. 6), and may be processed by a system (e.g., the system 610 of FIG. 6) to rank the user. Once ranked, the user may be identified in a list of users generated by a recruiter, a scout, and the like, and may be potentially recruited or drafted.

Figure 10:
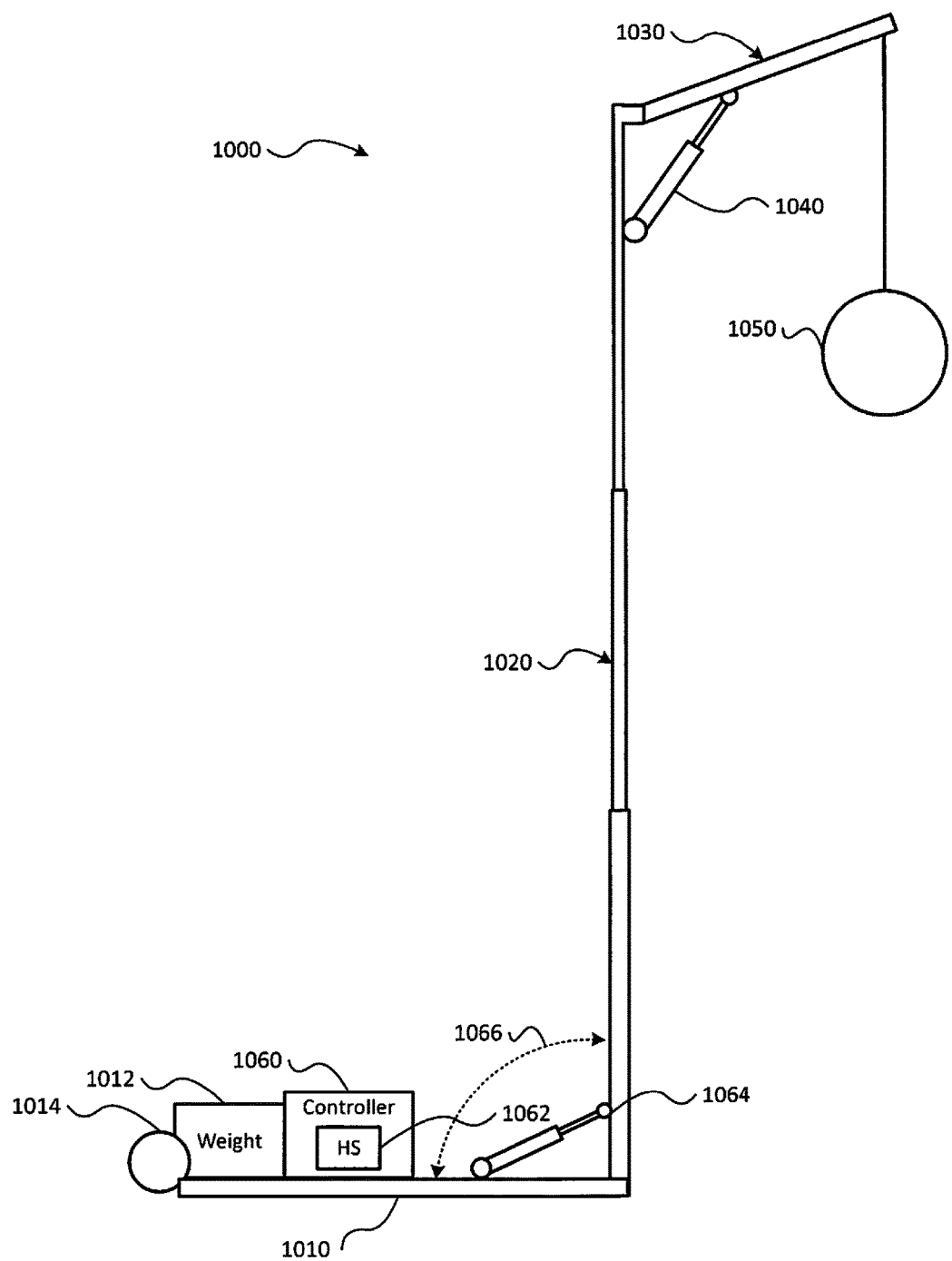
FIG. 10 is a block diagram of another embodiment of an apparatus for scoring a user.

Referring to FIG. 10, a block diagram of an embodiment of an apparatus according to an embodiment of the present disclosure is shown as an apparatus 1000. As shown in FIG. 10, the apparatus 1000 includes the base 110 of FIG. 1, which may include the weight 112, and one or more wheels 114. Additionally, as shown in FIG. 10, the apparatus 1000 may include a first member 1020, a second member 1030, and an object 1050 suspended from an end of the second member 1030 using an attachment means 1052. Further, the apparatus 1000 may include a controller 1060 configured to control a hydraulic system (HS) 1062. The controller 1060 and the HS 1062 may be coupled to a first hydraulic member 1064 and one or more hydraulic extender/retractor arms (not shown in FIG. 10). The controller 1060 may control the HS 1062 to cause the first hydraulic member 1064 to retract or extend the first member 1020, such as to place the apparatus 1000 into a folded configuration, such as the folded configuration illustrated in FIG. 2C, or a non-folded configuration, as shown in FIG. 10, where the non-folded configuration is a configuration of the apparatus 1000 suitable for performing a workout. In an embodiment, the attachment means 1052 may be the attachment means 152 of FIG. 1 or the attachment means 352 of FIG. 3, and the object 1050 may be the object 150 of FIG. 1 or the object 350 of FIG. 3. In an embodiment, the first member 920 and the second member 930 may be substantially similar to the first member 320 and the second member 330, respectively, described above with reference to FIG. 3. However, in the embodiment illustrated in FIG. 10, the various portions of the first member 1020 may be adjusted vertically by the one or more hydraulic extender/retractor arms under the control of the controller 1060 using the hydraulic system 1062. In the embodiment illustrated in FIG. 10, a user may perform a workout and record the workout data using a mobile communication device, as described above with reference to FIGS. 1-8. The workout data may then be stored at a remote database (e.g., the database 612 of FIG. 6), and may be processed by a system (e.g., the system 610 of FIG. 6) to rank the user. Once ranked, the user may be identified in a list of users generated by a recruiter, a scout, and the like, and may be potentially recruited or drafted.

Figure 11:
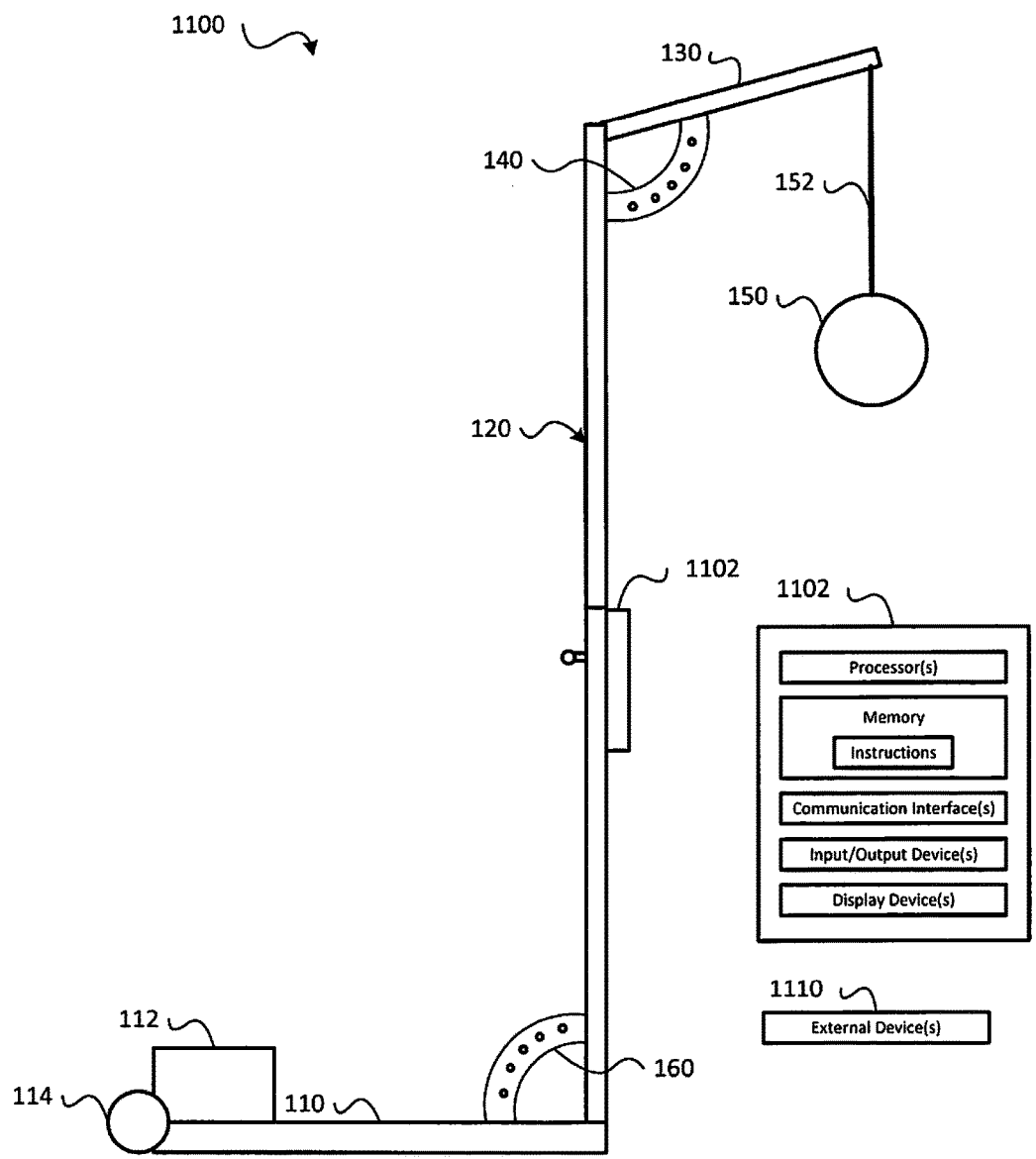
FIG. 11 is a block diagram of another embodiment of an apparatus for scoring a user.

Referring to FIG. 11, a block diagram of an embodiment of an apparatus according to an embodiment of the present disclosure is shown as an apparatus 1100. As shown in FIG. 11, the apparatus 1100 includes the base 110 of FIG. 1, which, in an embodiment, may include the weight 112, and one or more wheels 114, and includes the first member 120, the second member 130, the pivot assembly 140, the object 150, the attachment means 152, and the second pivot assembly 160 of FIG. 1. Additionally, as shown in FIG. 11, the apparatus 1100 may include a system 1102 that has been integrated with the apparatus 1100. As shown in FIG. 11, the system 1102 includes one or more processors, a memory, one or more communication interfaces, one or more input/output devices, and one or more display devices. The system 1102 may be configured to receive user login information, and communicate with a remote system, such as the system 610 of FIG. 6, to record workout data. For example, a user may perform a workout and record the workout data using the system 1102 (e.g., using the one or more input/output devices), as described above with reference to FIGS. 1-8. The workout data may then be stored at a remote database (e.g., the database 612 of FIG. 6) using at least one of the one or more communication interfaces (e.g., an 802.11 communication interface, or other wireless or wired communication interface) via a network, and the workout data may be processed by the system (e.g., the system 610 of FIG. 6) to rank the user. In an embodiment, the one or more communication interfaces may facilitate communication between the system 1102 and one or more accessory devices 1110. In an embodiment, the one or more accessory devices 1110 may include the accessory devices described with reference to FIGS. 4 and 5, and/or a user's mobile communication device. Once ranked, the user may be identified in a list of users generated by a recruiter, a scout, and the like, and may be potentially recruited or drafted.

Figure 12:
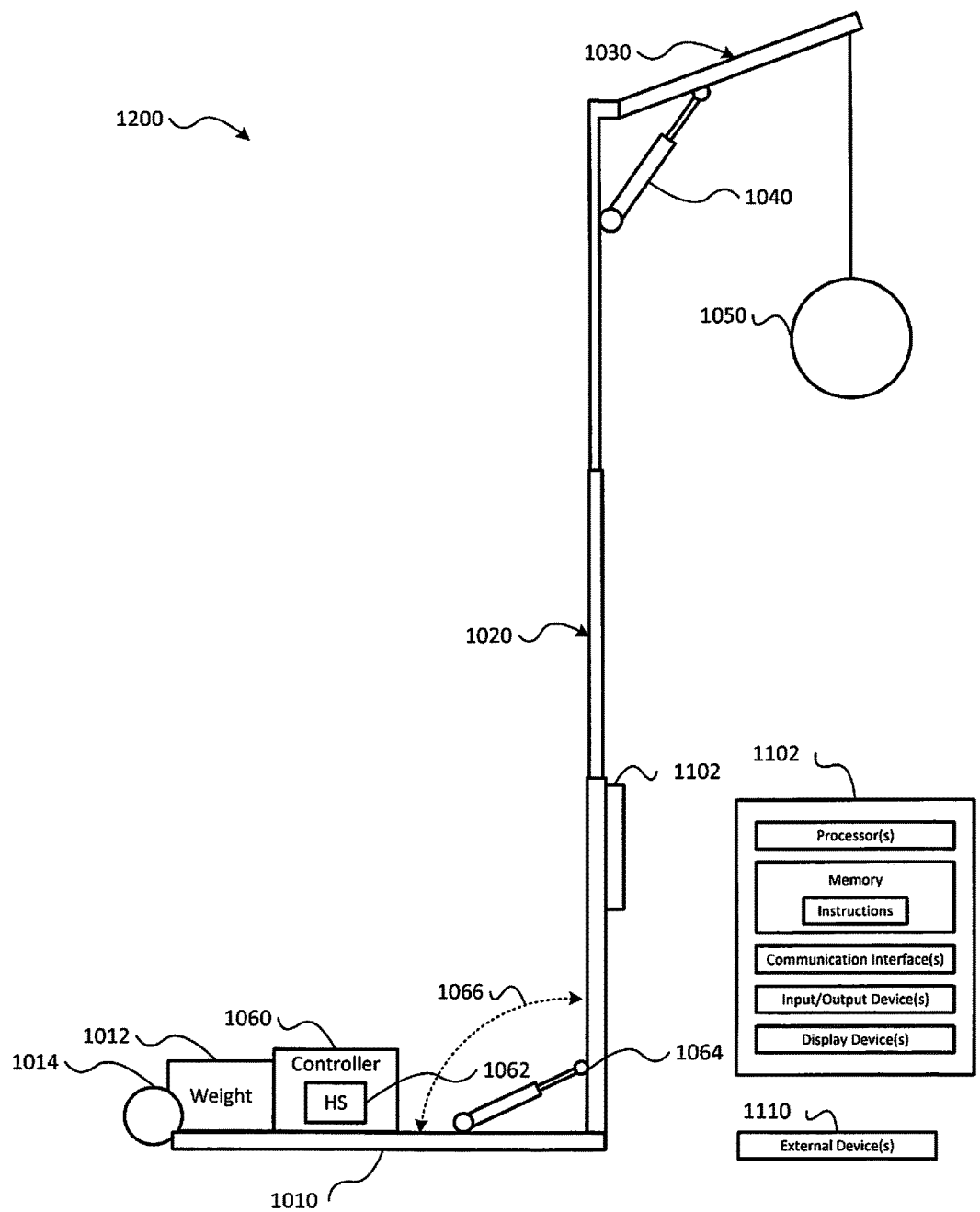
FIG. 12 is a block diagram of another embodiment of an apparatus for scoring a user.

Referring to FIG. 12, a block diagram of an embodiment of an apparatus according to an embodiment of the present disclosure is shown as an apparatus 1200. The apparatus 1200 may be substantially similar to the apparatus 1000 of FIG. 10, but may be integrated with the system 1102 of FIG. 11, described above. In an embodiment, when the user logs in to the system 1102 that has been integrated with the apparatus 1200, the system 1102 may automatically retrieve (e.g., from the memory of the system 1102, or a remote database, such as the database 612 of FIG. 6), user profile information that indicates a height for the object 1050, such as a height used for a most recent workout by the user, and the system 1102 may automatically instruct the controller to adjust the height of the object 1050 using the hydraulic system and the one or more extender/retractor arms to the appropriate height for the user's workout. In an embodiment, a prompt may be displayed at the display device of the system 1102 that asks the user whether he/she would like to increase the height of the object 1050. If the user adjusts the height of the object 1050, the new height may be stored in the user's profile for use in a subsequent workout.

Figure 13:
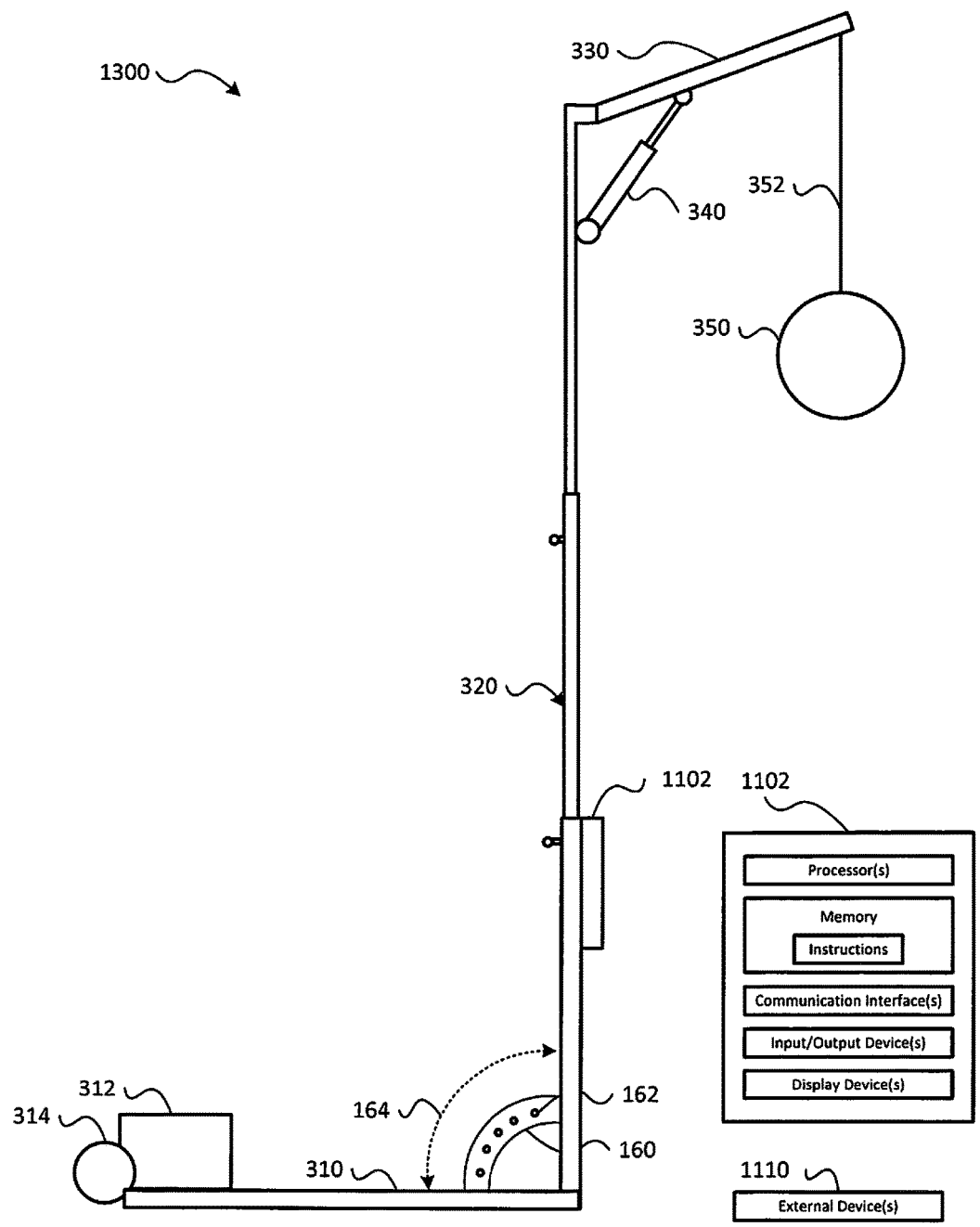
FIG. 13 is a block diagram of another embodiment of an apparatus for scoring a user.

Referring to FIG. 13 a block diagram of an embodiment of an apparatus according to an embodiment of the present disclosure is shown as an apparatus 1300. The apparatus 1300 may be substantially similar to the apparatus 300 of FIG. 3, but may be integrated with the system 1102 of FIG. 11, described above.

Figure 14:
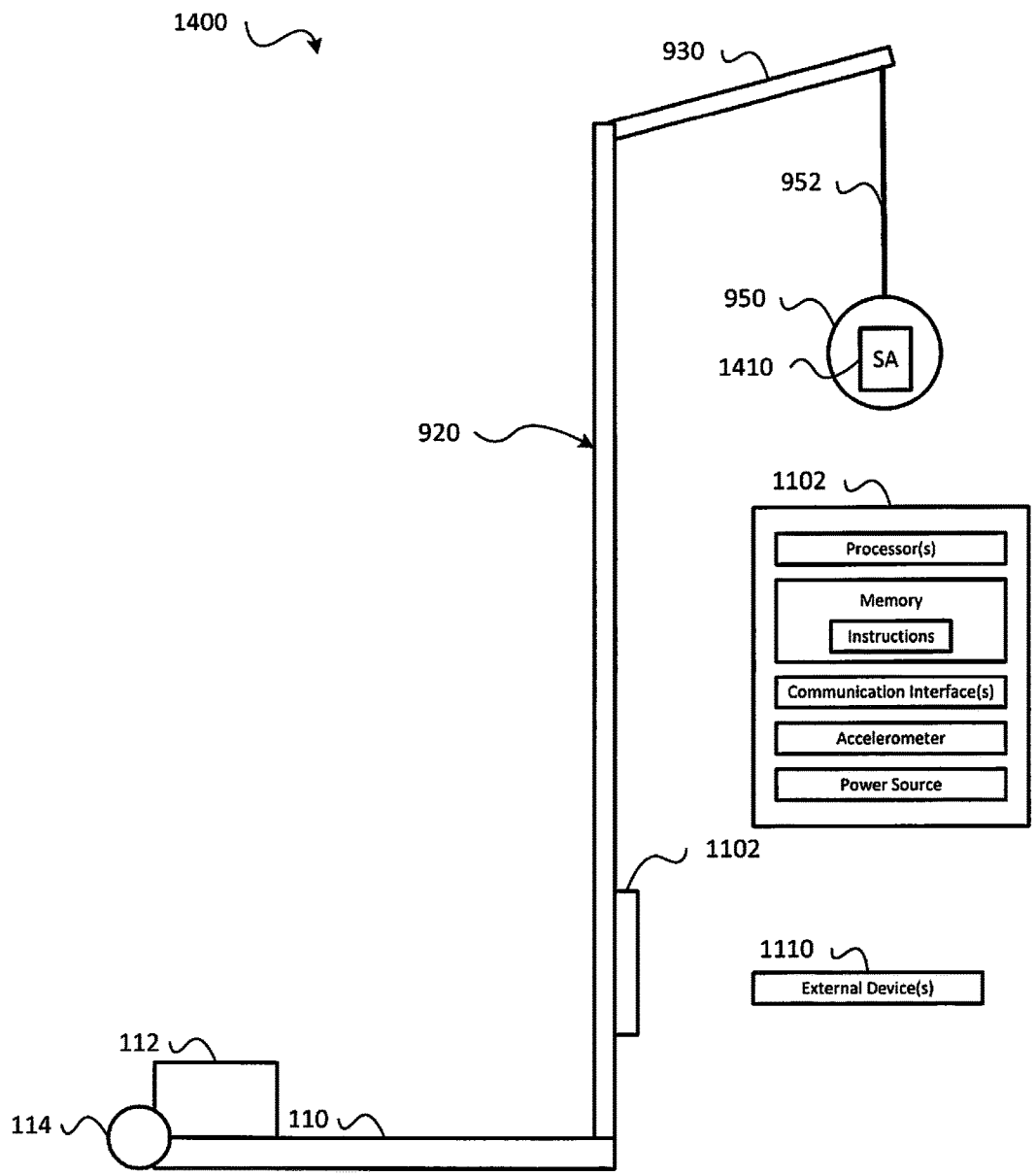
FIG. 14 is a block diagram of yet another embodiment of an apparatus for scoring a user.

Referring to FIG. 14 a block diagram of an embodiment of an apparatus according to an embodiment of the present disclosure is shown as an apparatus 1400. The apparatus 1200 may be substantially similar to the apparatus 900 of FIG. 9, but may be integrated with the system 1102 of FIG. 11, described above. However, the apparatus 1400 differs from the embodiment illustrated with respect to FIG. 9 with respect to the object 950. For example, in FIG. 14, the object 950 includes a sensor array 1410. In an embodiment, the sensor array 1410 may include one or more accelerometers, one or more gyroscopes, one or more processors, a memory, a power source, and one or more communication interfaces. The one or more accelerometers, the one or more gyroscopes, and the processor may be configured to detect movement of the object 950, such as when the user has grabbed the object during a repetition of a workout performed using the apparatus 1400. In an embodiment, the memory may store instructions that, when executed by the one or more processors, cause the one or more processors to detect a threshold movement of the object 950, where the threshold movement corresponds to an movement of the object 950 that is representative of the object 950 being grabbed and pulled by the user. The one or more communication interfaces may enable the processor to initiate transmission of workout data to the system 1102, or one of the accessory device 1110, such as the user's mobile communication device. It is noted that the object 950 and sensory array 1410, although only illustrated with respect to FIG. 14, may be used in connection with any of the embodiments disclosed herein, and, if such integration is utilized, one or more components illustrated in those other embodiments may be omitted, such as omitting the piston 340 in FIG. 13.

Embodiments of the present disclosure may increase the ability or likelihood of athletes in remote or less well-known areas to become "noticed" by people that have the ability to aid the athletes in advancing their athletic careers. Further, embodiments of the present disclosure promote academic excellence in addition to athletic excellence by educating athletes on the academic requirements for various colleges that are of interest to the athletes, and allowing the athletes to see where they stand with respect to those requirements. Additionally, embodiments of the present disclosure inject a sense of excitement into workouts because users of the workout apparatus of embodiments can see scores for their favorite college and pro athletes, and will want to work out to achieve similar scores. Still further, some embodiments allow users of the workout apparatus and system of embodiments to feel like a professional athlete by allowing the player to be drafted to a fantasy team, where their characters performance as a member of the fantasy team is directly tied to their performance during their workouts.

Although the present disclosure and certain representative advantages have been described in detail, it should be understood that various changes, substitutions and alterations can be made herein without departing from the spirit and scope of the disclosure as defined by the appended claims. For example, although signals generated by a controller are described throughout as "high" or "low," the signals may be inverted such that "low" signals turn on a switch and "high" signals turn off a switch. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
   a workout assembly comprising:
   a base;
   a first member oriented normal to the base, wherein a first end of the first member is coupled to the base;
   a second member coupled to a second end of the first member, wherein a first end of the second member is coupled to the second end of the first member, the first member disposed along a first axis, and wherein the second member is configured to pivot, at the first end of the second member, along a plane disposed longitudinally along the first axis;
   an object fixedly suspended, by attachment means having a first end and a second end, from a first point of a second end of the second member, the first end of the attachment means fixed to the first point of the second end of the second member, and the second end of the attachment means fixed to the object; and
   a piston having a first end fixed to the first member and a second end fixed to the second member, the piston configured to facilitate a pivoting action of the second member, wherein the piston is configured to facilitate the second member pivoting in a downward direction due to an application of a downward force upon the second member in response to the object being touched during operation, and wherein the piston is configured to cause the second member to pivot in an upward direction due when the downward force upon the second member is removed;
   a server comprising:
   a processor;
   a display device coupled to the first member;
   an input device;
   a network interface; and
   a memory storing instructions that, when executed by the processor, cause the processor to perform operations for capturing information representative of a workout performed using the workout assembly, the operations comprising:
   receiving login information associated with a user;
   receiving workout data representative of a number of times that the user touched the object during a workout;
   storing the workout data in the memory;
   generating a score based on the workout data, wherein the score represents a fitness level of the user; and
   assigning the user a rank with respect to one or more groups of additional users based on the user's score.

2. The system of claim 1, wherein the workout data comprises:
   information indicating a number of sets performed during the workout;
   information indicating a number of times that the user touched the object during each set;
   information indicating a distance between the object and a surface upon which the base is positioned during each set; and
   information indicating an amount of weight added to the user during each set.

3. The system of claim 2, the operations further comprising:
   calculating a first portion of the score is calculated based on the number of times that the user touched the object during a first set;
   calculating a second portion of the score based on an average number of times that the user touched the object during each set of the workout;
   calculating a third portion of the score based on the distance between the object and the surface upon which the base is positioned; and
   calculating a fourth portion of the score based on the amount of weight added to the user during each set.

4. The system of claim 1, wherein the one or more groups of additional users represent users in the same: city, first geographic region, state, second geographic region, nation, or a combination thereof, wherein the first geographic region corresponds to a portion of a state, and wherein the second geographic region corresponds to a group of states.

5. The system of claim 1, further comprising providing a gaming application, wherein the gaming application provides one or more games, each of the one or more games including at least one character having attributes determined based on the user's score.

6. The system of claim 1, the operations further comprising:
   receiving the workout data from a remote device via a network.

7. The system of claim 1, wherein the workout assembly further comprises one or more arms, each of the one or more arms coupled to the first member and configured to be pivoted about the first member during the workout, wherein the pivoting of at least one of the one or more arms causes the at least one arm to contact the user during performance of one or more workout activities to simulate a condition that the user will experience when playing a particular sport.

8. The system of claim 1, further comprising one or more sensors configured to capture sensor data during the workout, wherein the workout data is generated based at least in part on the sensor data.

9. A workout assembly comprising:
    a horizontal base;
    a first member oriented vertical with respect to the horizontal base, wherein a first end of the first member is coupled to the horizontal base;
    a second member coupled to a second end of the first member, wherein a first end of the second member is coupled to the second end of the first member, the first member disposed along a first axis, and wherein the second member is configured to pivot, at the first end of the second member, along a plane disposed longitudinally along the first axis;
    an object fixedly suspended, by attachment means having a first end and a second end, from a first point of a second end of the second member, the first end of the attachment means fixed to the first point of the second end of the second member, and the second end of the attachment means fixed to the object;
    a piston having a first end fixed to the first member and a second end fixed to the second member, the piston configured to facilitate a pivoting action of the second member, wherein the piston is configured to facilitate the second member pivoting in a downward direction due to an application of a downward force upon the second member in response to the object being touched during operation, and wherein the piston is configured to cause the second member to pivot in an upward direction due when the downward force upon the second member is removed; and
    a computing device coupled to the first member, the computing device comprising:
        a processor;
        a display device coupled to the first member;
        an input device;
        a network interface; and
        a memory storing instructions that, when executed by the processor, cause the processor to perform operations for capturing information representative of a workout, the operations comprising:
            receiving login information associated with a user;
            receiving workout data representative of a number of times that the user touched the object during a workout; and
            storing the workout data at a database of a remote system.

10. The workout assembly of claim 9, wherein the remote system is configured to:
    generate a score for the user based on the workout data;
    assign the user a rank with respect to one or more groups of additional users based on the user's score;
    receive a query specifying one or more parameters for filtering a plurality of user scores;
    in response to receiving the query, searching the database to identify users that satisfy one or more parameters of the query; and
    provide a list of users having scores that satisfy the one or more parameters of the query.

11. The workout assembly of claim 10, wherein the one or more parameters identify a position and a sport, and wherein the list of users identifies one or more users that play the sport and the position.

12. The workout assembly of claim 11, wherein the one or more parameters identify a target score, and wherein the list of users identifies one or more users having scores that are greater than or equal to the target score.

* * * * *